United States Patent
Sakemoto et al.

(10) Patent No.: US 7,820,968 B2
(45) Date of Patent: Oct. 26, 2010

(54) IMAGE ACQUISITION APPARATUS, CONVERSION APPARATUS AND IMAGE ACQUISITION METHOD

(75) Inventors: Akito Sakemoto, Ibaraki (JP); Satoru Onuki, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 163 days.

(21) Appl. No.: 12/219,761

(22) Filed: Jul. 28, 2008

(65) Prior Publication Data

US 2009/0078873 A1 Mar. 26, 2009

(30) Foreign Application Priority Data

Aug. 10, 2007 (JP) ............... 2007-209548
Jul. 7, 2008 (JP) ............... 2008-176510

(51) Int. Cl.
*G02F 1/01* (2006.01)
(52) U.S. Cl. .................................... 250/330
(58) Field of Classification Search ................. 250/330
See application file for complete search history.

(56) References Cited

U.S. PATENT DOCUMENTS 4,082,413 A * 4/1978 Austin et al. .............. 359/360
5,115,336 A * 5/1992 Schildkraut et al. ........ 359/263
2008/0233291 A1* 9/2008 Chandrasekaran .......... 427/299

OTHER PUBLICATIONS

Patskovsky et al., "Properties and sensing characteristics of surface-plasmon resonance in infrared light," 2003, Journal of Optical Society of America, vol. 20, No. 8, pp. 1644 1650.*

* cited by examiner

*Primary Examiner*—David P Porta
*Assistant Examiner*—Kiho Kim
(74) *Attorney, Agent, or Firm*—Oliff & Berridge, PLC

(57) ABSTRACT

An image acquisition apparatus acquires an image indicating an intensity distribution of infrared light. The image acquisition apparatus includes a conductive thin film, a dielectric layer placed on the thin film, a base to support the thin film and the dielectric layer in this order on a principal surface, a light source to emit light to an interface between the thin film and the base, and an image pickup device to receive light reflected on the interface between the thin film and the base.

25 Claims, 24 Drawing Sheets

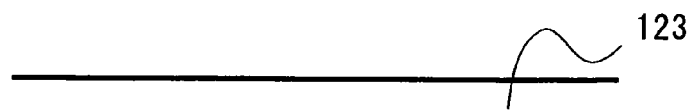
Fig. 23A
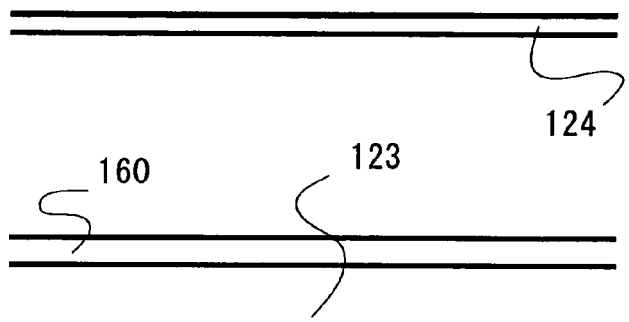
Fig. 23B
Fig. 23C
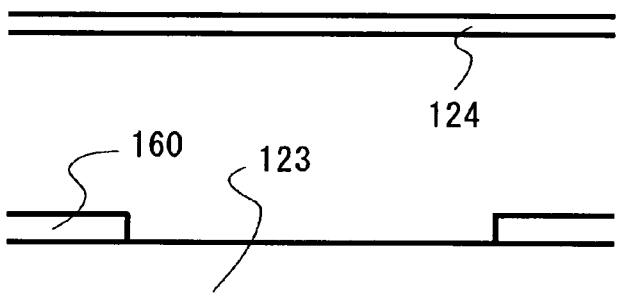
Fig. 23D
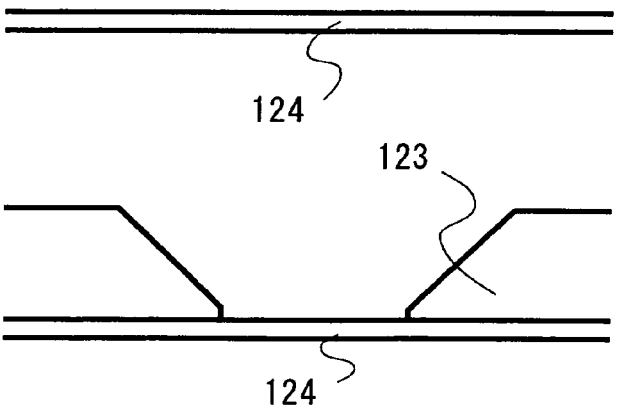
Fig. 23E
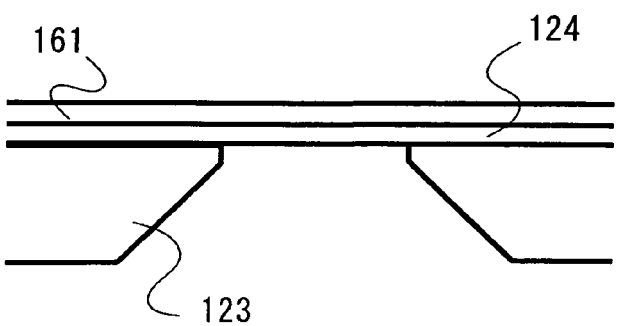

IMAGE ACQUISITION APPARATUS, CONVERSION APPARATUS AND IMAGE ACQUISITION METHOD

BACKGROUND OF THE INVENTION

1. Field of the Invention

The present invention relates to an image acquisition apparatus, a conversion apparatus and an image acquisition method.

2. Description of Related Art

Recent developments in security-related technologies are significant for a wide range of monitoring applications such as security screening and suspicious person monitoring system. Accordingly, the demand for an infrared camera that is applicable to the monitoring purpose in addition to a simple temperature measurement purpose is rapidly growing.

There are typically two kinds of infrared cameras: a quantum well infrared camera and a bolometer infrared camera. Quantum well infrared cameras generally require cooling for resistance to thermal noise, which causes a large size and high cost apparatus as a whole. On the other hand, although various types of bolometer infrared cameras have been developed with the growth of micro electro mechanical systems (MEMS) technology, the apparatus structure is complicated due to the need to place a mechanism for thermal detection in each pixel and a mechanism for signal reading from each pixel.

Therefore, there is a limit to simplification of the structure of existing infrared cameras.

SUMMARY OF THE INVENTION

In light of the foregoing, it is desirable to provide an image acquisition apparatus of a novel type with a simple structure or a novel image acquisition method.

According to an embodiment of the present invention, there is provided an image acquisition apparatus which includes a conductive thin film, a dielectric layer placed on the thin film, a base to support the thin film and the dielectric layer in this order on a principal surface, a light source to emit light to an interface between the thin film and the base, and an image pickup device to receive light reflected on the interface between the thin film and the base.

An intensity distribution of externally incident infrared light is converted into a dielectric constant distribution in the dielectric layer. The dielectric constant distribution in the dielectric layer is then converted into an intensity distribution of reflected light that is reflected on the interface between the thin film and the base and incident on the image pickup device. Accordingly, an image corresponds to the intensity distribution of the externally incident infrared light is acquired by the image pickup device. It is thereby possible to achieve the image acquisition apparatus with a simple structure compared with the related art.

It is preferred that the image acquisition apparatus further includes an infrared light absorbing layer placed on the dielectric layer. This enhances the efficiency of converting the intensity distribution of infrared light into the intensity distribution of reflected light.

It is preferred that the image acquisition apparatus further includes a filter placed above the infrared light absorbing layer, to transmit externally incident infrared light and block externally incident light having a wavelength different from a desired wavelength. This provides the image acquisition apparatus that can be used in general environments.

It is preferred that the image acquisition apparatus further includes a light shielding member placed above the infrared light absorbing layer, to partially prevent externally incident infrared light from entering the infrared light absorbing layer. This enables setting of a dummy thermal region, thereby providing the structure capable of eliminating an ambient component.

It is preferred that the infrared light absorbing layer is divided into a plurality of pieces by a plurality of grooves extending substantially parallel to the principal surface of the base. This suppresses heat transfer between adjacent pieces, thereby increasing the clearness of a finally obtained image.

It is preferred that the image acquisition apparatus further includes a plurality of condenser lenses. This provides the image acquisition apparatus with a wider viewing angle.

It is preferred that the image acquisition apparatus further includes a support member to hold the filter in an opening and have a light shielding portion to partially prevent externally incident infrared light from entering the infrared light absorbing layer. This enables easy positioning in addition to the advantage obtained in the case of including the light shielding member.

It is preferred that the dielectric layer is divided into a plurality of pieces by a plurality of grooves extending substantially parallel to the principal surface of the base. This suppresses heat transfer between adjacent pieces, thereby increasing the clearness of a finally obtained image.

It is preferred that the thin film is divided into a plurality of pieces by a plurality of grooves extending substantially parallel to the principal surface of the base. This suppresses heat transfer between adjacent pieces, thereby increasing the clearness of a finally obtained image.

It is preferred that the image acquisition apparatus further includes a lens to parallelize light emitted from the light source.

It is preferred that the image acquisition apparatus further includes a polarizer to output light in a predetermined polarized state based on input of light emitted from the light source.

It is preferred that the base includes a flat-plate substrate having a first surface corresponding to the principal surface and a second surface opposite to the first surface, and a plurality of projecting portions placed on the second surface of the substrate, and each of the plurality of projecting portions has a light input surface for input of light emitted from the light source and a light output surface for output of light reflected from the interface. This reduces the thickness of the base as a whole, thereby enabling size reduction of the image acquisition apparatus.

According to another embodiment of the present invention, there is provided an image acquisition apparatus for acquiring an image indicating an intensity distribution of externally incident infrared light, which includes a conductive thin film, a dielectric layer placed on the thin film, where a dielectric constant distribution is generated corresponding to an intensity distribution of the infrared light based on input of the infrared light, a base to support the thin film and the dielectric layer in this order on a principal surface, a light source to emit light to an interface between the thin film and the base, and an image pickup device to receive light reflected on the interface between the thin film and the base and having a light intensity distribution corresponding to the dielectric constant distribution.

According to another embodiment of the present invention, there is provided an image acquisition apparatus for acquiring an image indicating an intensity distribution of infrared light, which includes a conductive thin film, a dielectric layer placed on the thin film, a base to support the thin film and the dielectric layer in this order on a principal surface, and an image pickup device to receive light reflected on an interface between the thin film and the base.

According to another embodiment of the present invention, there is provided an image acquisition apparatus which includes a laminate including a heat ray absorbing layer laminated on a dielectric layer formed by attaching conductive particles to a surface of a dielectric, a light source to emit light to be incident on the laminate, and an image pickup unit to receive light emitted from the light source and intensity-modulated by the dielectric layer and to capture an image corresponding to an intensity distribution of a heat ray incident on the laminate.

The heat ray absorbing layer that absorbs an external heat ray and the dielectric layer that is formed by attaching the conductive particles to the surfaces of the dielectrics are laminated. Then, light is applied to the dielectric layer, so that the intensity-modulated light is output from the dielectric layer. This enables acquisition of an image corresponding to the intensity distribution of the heat ray incident on the laminate. It is thereby possible to achieve the image acquisition apparatus with a simple structure.

It is preferred that the laminate is divided into a plurality of island portions arranged two-dimensionally by a plurality of grooves cut to depth in a lamination direction of the laminate.

It is preferred that the image acquisition apparatus further includes a supporting member to support the laminate, and the supporting member includes a heat insulating layer to support the laminate on a principal surface, and a supporting substrate with the heat insulating layer placed on a principal surface.

It is preferred that the supporting substrate has a plurality of openings in positions corresponding to the plurality of island portions.

It is preferred that the laminate further includes a light reflecting layer placed between the heat ray absorbing layer and the dielectric layer, to reflect light emitted from the light source.

It is preferred that the dielectric layer is formed by flocculating dielectrics in particle form with the conductive particles attached to surfaces.

According to another embodiment of the present invention, there is provided a conversion apparatus which includes a dielectric layer formed by attaching conductive particles to a surface of a dielectric, a heat ray absorbing layer to absorb a hear ray, and a supporting member with at least the dielectric layer and the heat ray absorbing layer laminated on a principal surface.

According to another embodiment of the present invention, there is provided an image acquisition method for acquiring an image indicating an intensity distribution of a heat ray, which includes applying light to a laminate including a heat ray absorbing layer laminated on a dielectric layer formed by attaching conductive particles to a surface of a dielectric, and receiving light intensity-modulated by the dielectric layer and capturing an image corresponding to an intensity distribution of a heat ray incident on the laminate.

According to the embodiments of the present invention described above, it is possible to provide an image acquisition apparatus of a novel type with a simple structure.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIGS. 23A to 23I are the schematic procedural flow charts showing a manufacturing method of the conversion apparatus according to the eighth embodiment of the present invention.

DETAILED DESCRIPTION OF THE PREFERRED EMBODIMENTS

Embodiments of the present invention are described hereinafter with reference to the drawings. Each embodiment is simplified for convenience of description. The drawings are given in simplified form by way of illustration only, and thus are not to be considered as limiting the present invention. The drawings are given merely for the purpose of explanation of technological matters, and they do not show the accurate scale or the like of each element shown therein. The same elements are denoted by the same reference symbols, and the redundant explanation is omitted. The terms indicating the directions, such as up, down, left and right, are used on condition that each drawing is viewed from the front. The below-described embodiments are not independent of each other and to be considered as being appropriately combined with each other.

First Embodiment

A first embodiment of the present invention is described hereinafter with reference to FIGS. 1 to 6.

Figure 1:
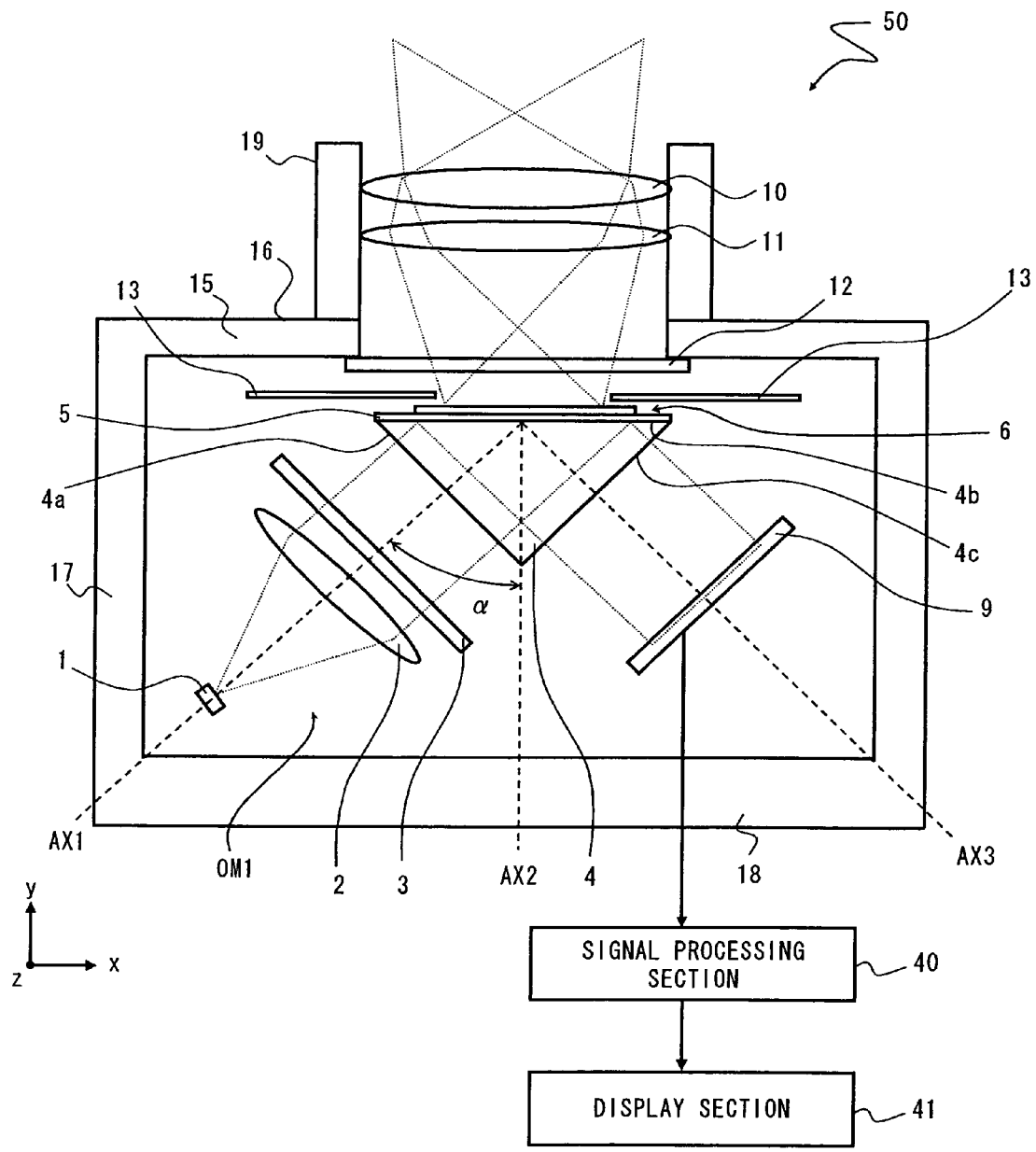
FIG. 1 is a view illustrating the schematic structure of an infrared camera 50 according to a first embodiment of the present invention.
Figure 2:
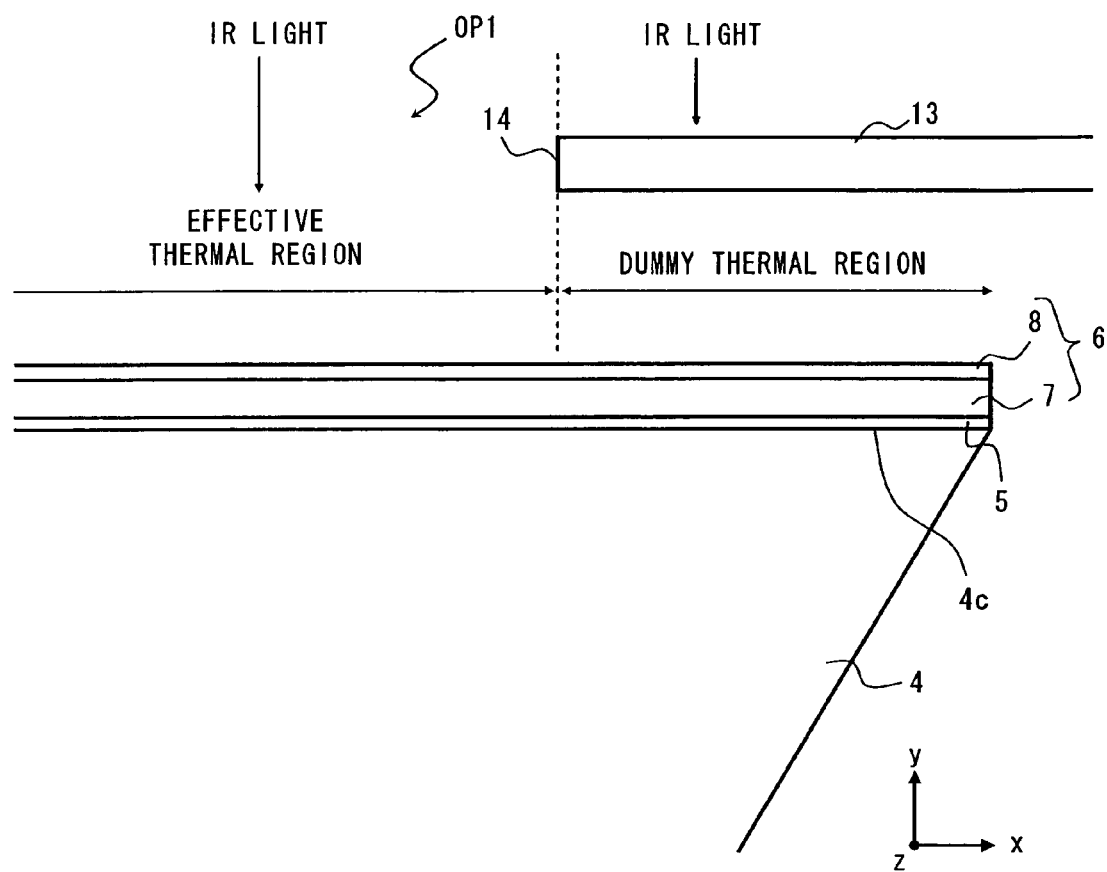
FIG. 2 is an explanatory view illustrating the structure of a laminate on the front surface of a prism.
Figure 3:
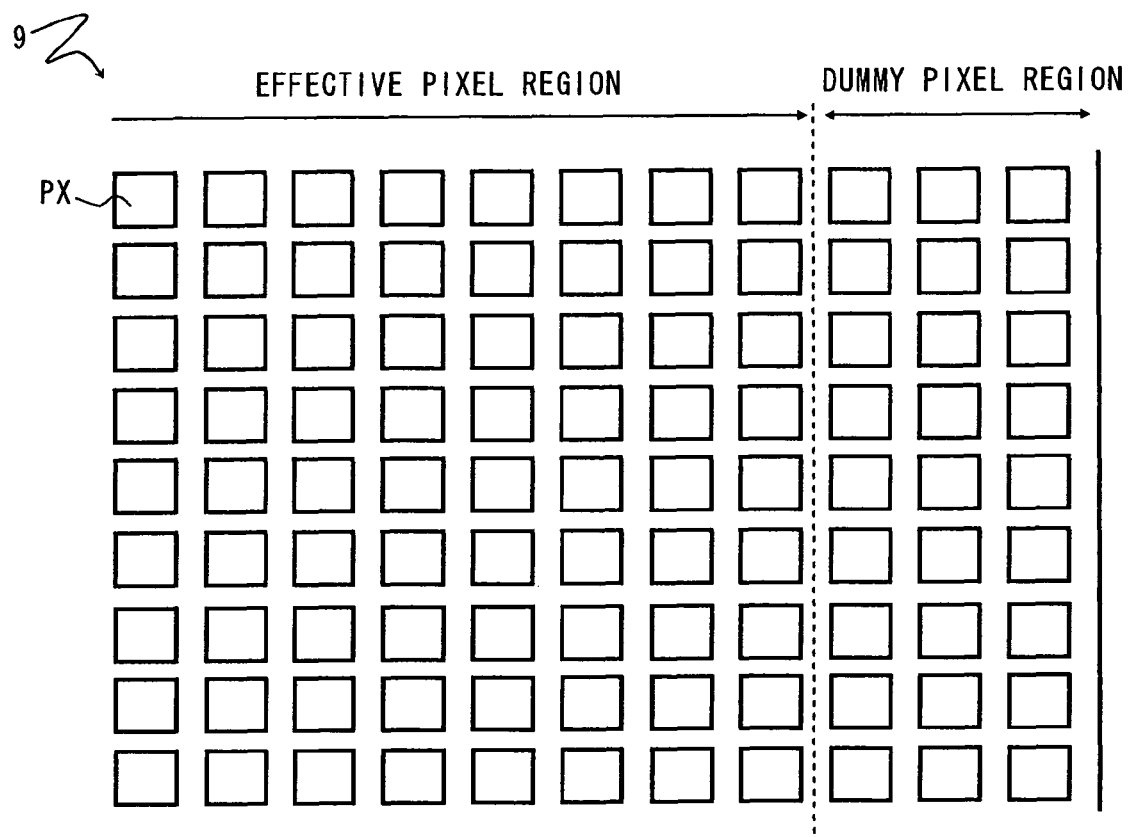
FIG. 3 is an explanatory view schematically showing a part of a light receiving surface of an image pickup device viewed from above.
Figure 4:
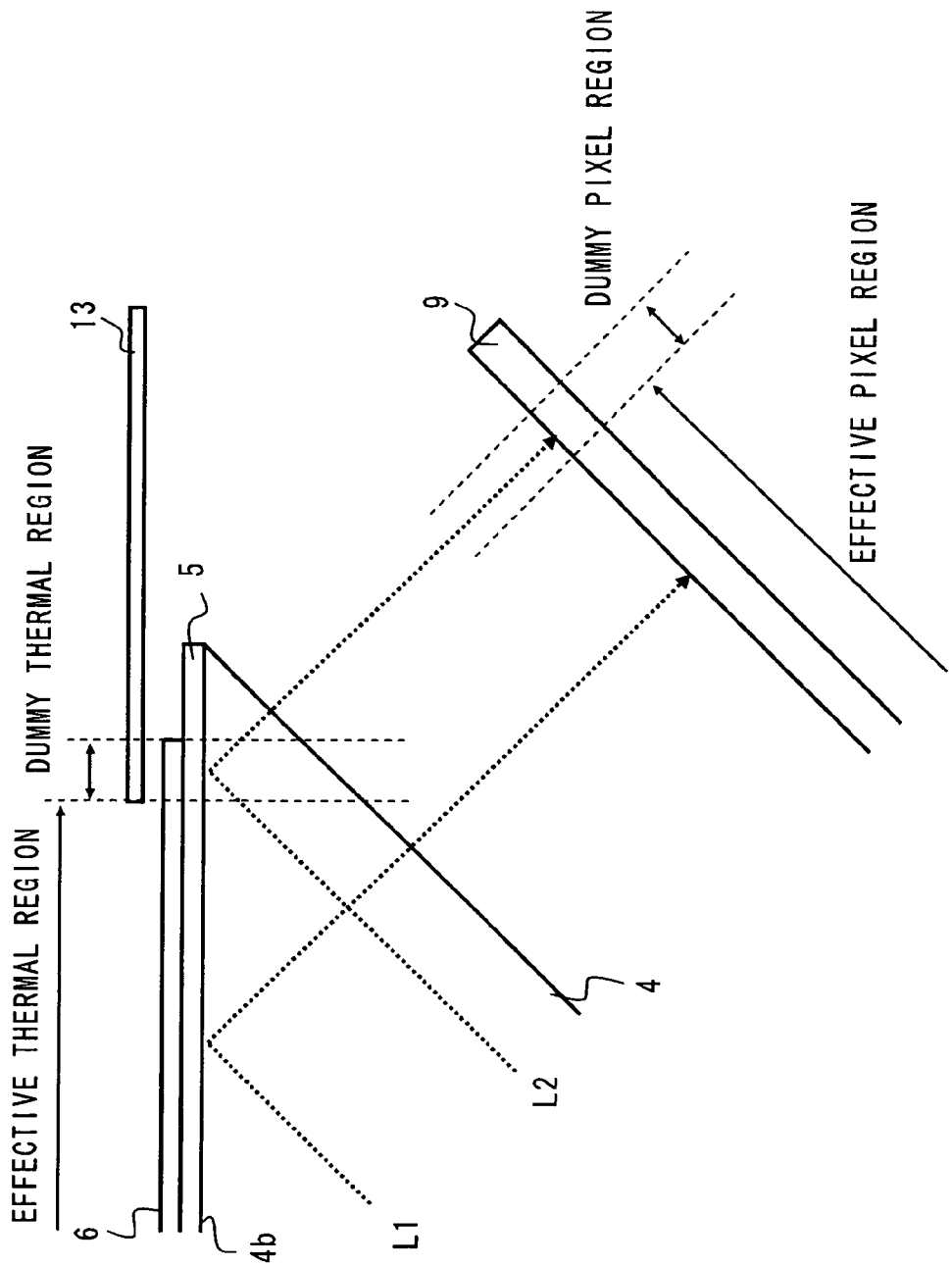
FIG. 4 is an explanatory view illustrating the operation of an infrared camera.
Figure 5:
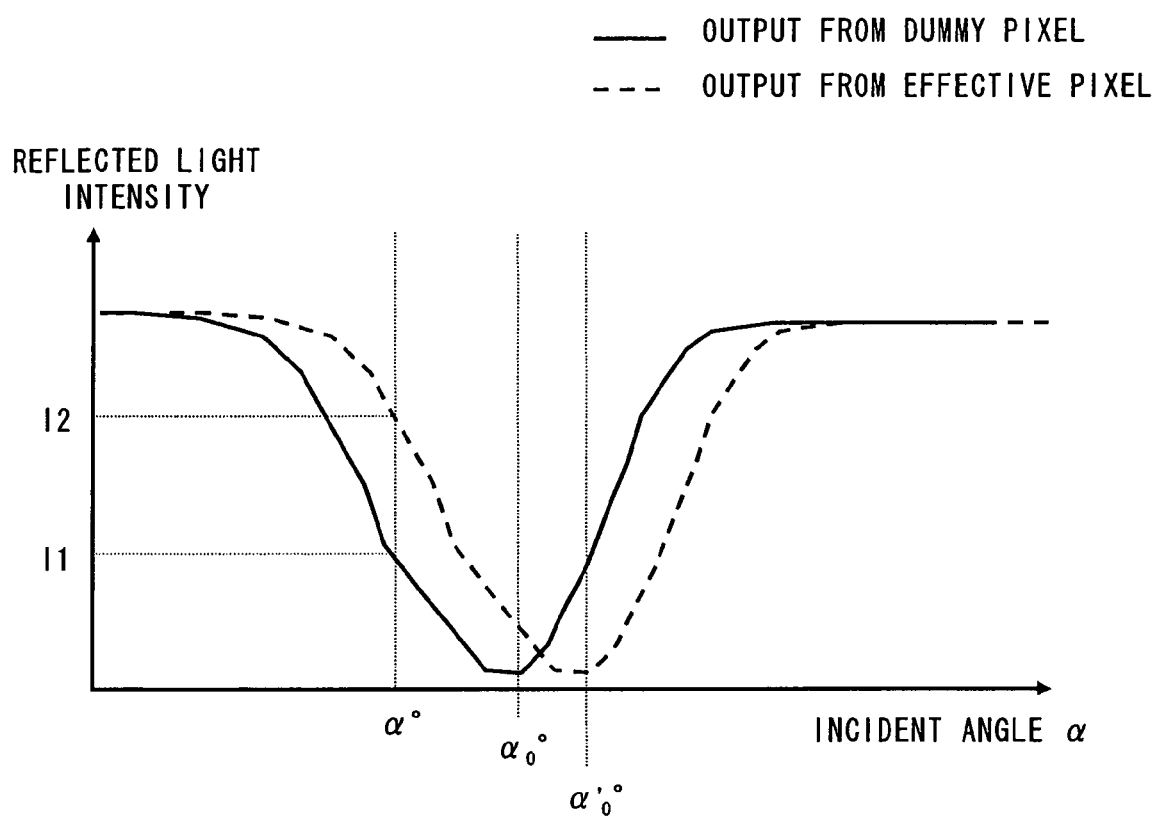
FIG. 5 is a graph showing the dependence of an incident angle α on a reflected light intensity.
Figure 6:
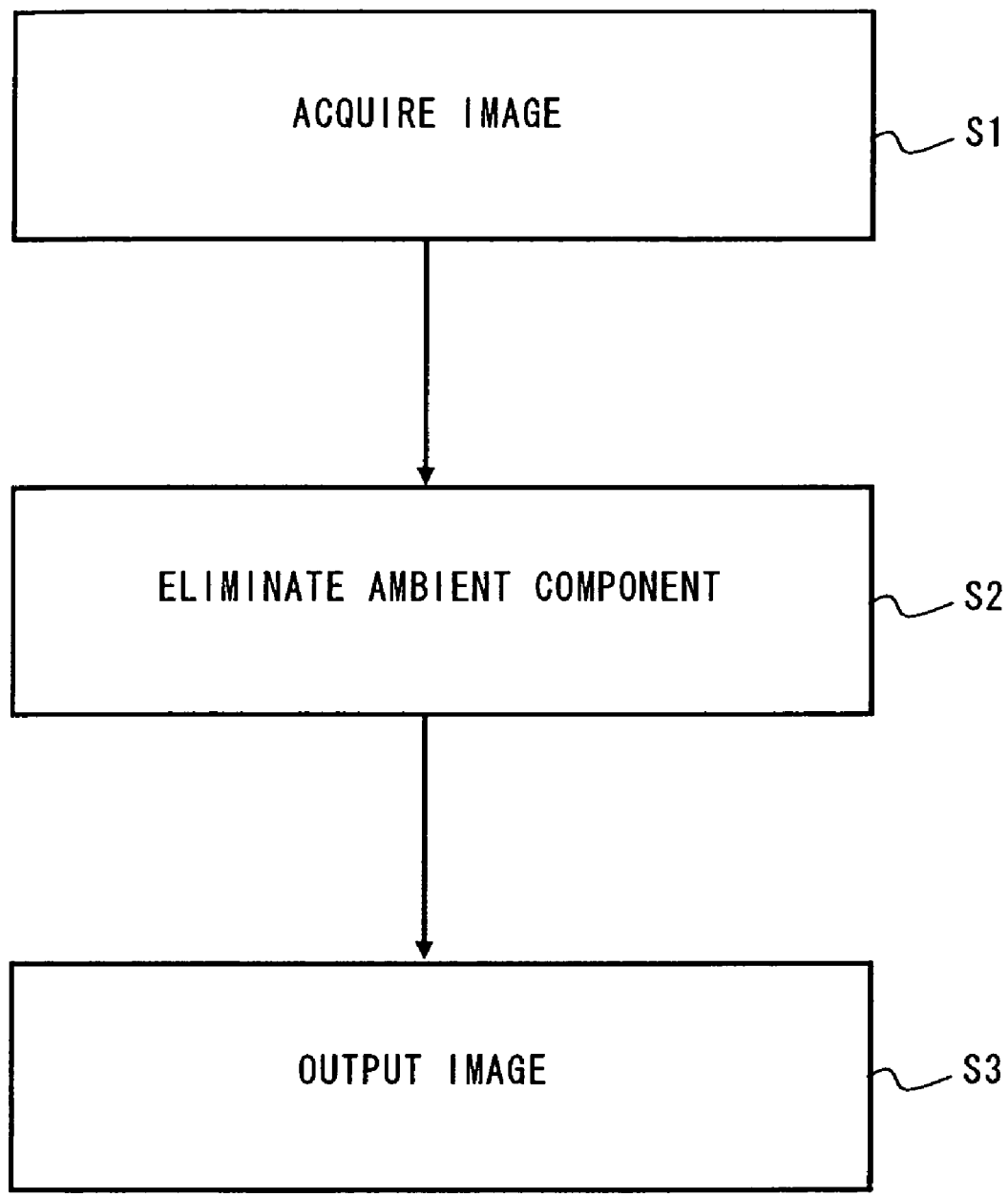
FIG. 6 is a flowchart illustrating the operation of a signal processing section.

FIG. 1 is a view to describe the schematic structure of an infrared camera 50. FIG. 2 is an explanatory view to describe the structure of a laminate on the front surface of a prism. FIG. 3 is an explanatory view schematically showing a part of a receiving surface of an image pickup device viewed from above. FIG. 4 is an explanatory view to describe the operation of an infrared camera. FIG. 5 is a graph showing the dependence of an incident angle α on a reflected light intensity. FIG. 6 is a flowchart to describe the operation of a signal processing section.

Referring to FIG. 1, an infrared camera (image acquisition apparatus) 50 includes a LED (light emitting diode) 1, a lens 2, a polarizing plate (polarizer) 3, a prism (base) 4, a metal film (thin film) 5, a laminate 6, an image pickup device 9, a lens 10, a lens 11, a filter 12, a mask (light shielding member) 13, and a case 15. On a front surface (principal surface) 4b of the prism 4, the metal film 5, the laminate 6, the mask 13, the filter 12, the lens 11 and the lens 10 are placed on top of one another in this order. An optical system OM1 on the light emitting side is composed of the LED 1, the lens 2 and the polarizing plate 3.

The LED 1 is a semiconductor light emitting device that functions as a light source and emits randomly polarized light. Instead of the LED, a laser diode (LD) that emits light in a predetermined polarized state may be used. This eliminates the need for the polarizing plate, which is described later, thus enabling further simplification of the apparatus structure.

The lens 2 is an optical device that parallelizes the light emitted from the LED 1. The light emitted from the LED 1 is parallelized through the lens surface of the lens 2. The lens 2 outputs parallelized light based on the incident light emitted from the LED 1. In this description, parallelization of light refers to changing the propagation direction of light in such a way that all of light rays propagate along the axis line AX1. The axis line AX1 is inclined at an angle α with respect to the normal AX2 to the front surface 4b of the prism 4. The angle is appropriately determined according to a surface plasmon resonance angle $\alpha_0$ that is determined by a wavelength of the LED 1 and a refractive index (dielectric constant) of a dielectric layer 7. The axis line AX3 is also inclined at an angle α with respect to the normal AX2.

The polarizing plate 3 outputs p-polarized light based on input of the light emitted from the LED 1. If the p-polarized light is incident on the metal film 5 under the total reflection condition, an evanescent wave is effectively generated on the metal film 5, and the resonance state occurs when the surface plasmon excited on the surface of the metal film 5 and the wave number correspond to each other. This is the phenomenon called surface plasmon resonance, in which the energy of an incident light ray from the LED 1 is consumed and the intensify of reflected light is reduced. The oscillation direction of the light output from the polarizing plate 3 is perpendicular to the axis line AX1 and parallel to the normal AX2. The polarizing plate 3 may be any one of an absorption type and a reflection type. The optical system OM1 that is composed of the LED 1, the lens 2 and the polarizing plate 3 outputs light so that the output light is totally reflected on the interface between the prism 4 and the metal film 5.

The prism 4 is a glass member that is substantially transparent in the wavelength range of the light emitted from the LED 1. The prism 4 has a shape with a triangular cross section, having a left back surface (first back surface) 4a, the front surface (principal surface) 4b and a right back surface (second back surface) 4c. The metal film 5 and the laminate 6 are placed on top of the front surface 4b of the prism 4. In other words, the prism 4 supports the metal film 5 and the laminate 6 on the front surface 4b.

The light that is emitted from the LED 1, parallelized by the lens 2 and changed into p-polarized light by the polarizing plate 3 is input to the prism 4 through the left back surface 4a. In other words, the left back surface 4a of the prism 4 functions as an input surface of the light from the LED 1.

The light that is input to the prism 4 through the left back surface 4a and is totally reflected on the interface between the front surface 4b of the prism 4 and the metal film 5 is output from the prism 4 through the right back surface 4c. In other words, the right back surface 4c of the prism 4 functions as an output surface of the light reflected on the interface between the front surface 4b of the prism 4 and the metal film 5.

The metal film 5 is a conductive thin film, which is formed on the front surface 4b of the prism 4 by a normal thin film formation process (e.g. sputtering, vapor deposition etc.). The metal film 5 may be made of a metal such as gold (Au) or silver (Ag), for example. The thickness of the metal film 5 is set so as to enable generation of an evanescent wave and localization of surface plasmon (the preferred thickness of the metal film 5 is about 50 nm).

The structure of the laminate 6 is described later with reference to FIG. 2.

The image pickup device 9 is a general solid-state image pickup device, which may be a CCD (Charge Coupled Device), a CMOS (Complementary Metal-Oxide Semiconductor), a TFT (Thin Film Transistor) or the like, for example. The image pickup device 9 includes a plurality of pixels that are arranged in matrix on its light receiving surface. The image pickup device 9 acquires an image in which the intensity distribution of incident light appears based on an output voltage from each pixel.

The lens 10 is a condenser lens that introduces outside light into the infrared camera 50. The lens 10 may be made of a material such as silicon (Si), germanium (Ge), calcium fluoride ($CaF_2$) or zinc selenide (ZnSe), for example. Input of outside light into the infrared camera 50 through the condenser lens enables detection of a thermal image (i.e. an image indicating the intensity distribution of infrared light) in a wider range. The function and structure of the lens 11 are the same as those of the lens 10.

The filter 12 is a plate bandpass filter that transmits light in the infrared region (infrared light) and blocks light outside the infrared region (e.g. visible light), of white light condensed by the lenses 10 and 11. The filter 12 transmits only the infrared light that is contained in outside light to effectively input the infrared light as a signal component into an infrared light absorbing layer that is included in the laminate 6. The infrared camera 50 can thereby acquire a thermal image with a smaller noise.

The mask 13 blocks the propagation of infrared light input from the front side toward the backside by reflecting or absorbing the infrared light. The mask 13 may be a mirror-surface metal plate with a low emissivity. As described later, an effective thermal region is set to the laminate 6 so as to correspond to the opening of the mask 13, and further a dummy thermal region is set to the laminate 6.

The case 15 is a box member having a cover plate 16, a shell plate 17 and a base plate 18. The case 15 further has a cylinder 19 that supports the lenses 10 and 11 by its inner wall on the top surface of the cover plate 16. The case 15 contains the LED 1, the lens 2, the polarizing plate 3, the prism 4, the metal film 5, the laminate 6, the image pickup device 9, the lens 10, the lens 11, the filter 12 and the mask 13. The case 15 is made of a material that shields outside light so as to prevent the image pickup device 9 from detecting outside light. The cover plate 16 and the shell plate 17 are preferably separate members in terms of manufacturing.

The filter 12 is placed under the cover plate 16 so as to close the opening of the cover plate 16. This prevents outside light as a noise component that is input through the lenses 10 and 11 from reaching the inside of the box member formed by the cover plate 16, the shell plate 17 and the base plate 18.

As shown in FIG. 1, a signal processing section 40 is connected to the image pickup device 9. Further, a display section 41 is connected to the signal processing section 40. The signal processing section 40 produces the above-described thermal image based on a voltage output from the image pickup device 9. The display section 41 displays the thermal image that is output from the signal processing section 40. The signal processing section 40 is configured as software to be installed on a general computer. The display section 41 is a liquid crystal display device or the like to be connected to a computer. The operation of the signal processing section 40 is described later.

FIG. 2 is an explanatory view illustrating the structure on the front surface 4b of the prism 4. Referring to FIG. 2, the metal film 5 and the laminate 6 are placed on top of each other in this order on the front surface 4b of the prism 4.

The laminate 6 has a dielectric layer 7 as a first layer and an infrared light absorbing layer 8 as a second layer. The dielectric layer 7 is made of a dielectric material such as BST ((Ba—Sr)TiO$_3$). The infrared light absorbing layer 8 is made of a material such as Au-black, aluminum or nitride (AlN). The dielectric layer 7 and the infrared light absorbing layer 8 may be formed on the metal film 5 by a normal thin film formation process or may be formed by coating and firing a fine particulate material. The thickness of the dielectric layer 7 is about 200 nm. The thickness of the infrared light absorbing layer 8 is about 50 to 1000 nm.

The infrared light that is introduced through the lenses 10 and 11 and transmitted through the filter 12 is absorbed by the infrared light absorbing layer 8. Then, the heat absorbed by the infrared light absorbing layer 8 is transferred to the dielectric layer 7. The dielectric constant of the dielectric layer 7 changes according to the heat transferred from the infrared light absorbing layer 8. A heat distribution that occurs in the infrared light absorbing layer 8 by the input of infrared light corresponds to the intensity distribution of the input infrared light. The heat distribution that occurs in the infrared light absorbing layer 8 is converted into a dielectric constant distribution that occurs in the dielectric layer 7. Thus, the dielectric constant distribution that occurs in the dielectric layer 7 corresponds to the intensity distribution of the input infrared light.

Because the infrared light absorbing layer 8 is placed immediately above the dielectric layer 7, the infrared light input from the outside is effectively converted into heat. Then, the intensity distribution of the infrared light input from the outside is effectively converted into the dielectric constant distribution in the dielectric layer 7.

As shown in FIG. 2, the effective thermal region is set to the laminate 6 according to the opening OP1 of the mask 13. Further, the dummy thermal region is set to the laminate 6. The mask 13 blocks the backward propagation of infrared (IR) light as described earlier. It is thus set not to input infrared light to the dummy thermal region. By setting the effective thermal region and the dummy thermal region to the laminate 6 in this manner, it is possible to eliminate an ambient component from an image that is finally obtained. This enables acquisition of a clearer thermal image.

FIG. 3 is an explanatory view schematically showing the light receiving surface of the image pickup device 9 viewed from above. As shown in FIG. 3, a plurality of pixels PX are arranged in matrix in the image pickup device 9. In each pixel PX, a photocurrent is generated according to the amount of incident light. The photocurrent generated in the pixel PX is converted into a voltage by an IV converter and output as a voltage signal.

As shown in FIG. 3, an effective pixel region and a dummy pixel region are set in the area where the pixels PX are arranged. The effective pixel region is a pixel region for capturing a thermal image to be finally acquired. The dummy pixel region is a pixel region for acquiring an ambient component to be eliminated from the thermal image acquired in the effective pixel region. The effective pixel region is set corresponding to the effective thermal region. The dummy pixel region is set corresponding to the dummy thermal region.

FIG. 4 is an explanatory view illustrating the operation of the infrared camera 50. As shown in FIG. 4, a light ray L1 that is emitted from the LED 1 is totally reflected on the interface between the metal film 5 and the prism 4 and received by the image pickup device 9. This is the same for a light ray L2. The light ray L1 is totally reflected on the reflection region of the metal film 5 that corresponds to the effective thermal region and incident on a pixel in the effective pixel region. On the other hand, the light ray L2 is totally reflected on the reflection region of the metal film 5 that corresponds to the dummy thermal region and incident on a pixel in the dummy pixel region.

In the effective thermal region, based on the input of infrared light from the outside, the dielectric constant distribution corresponding to the intensity distribution of the infrared light is generated in the dielectric layer 7. This is because the infrared light input from the outside is converted into heat in the infrared light absorbing layer 8, and the heat produced in the infrared light absorbing layer 8 changes the dielectric constant of the dielectric layer 7 as described earlier.

Total reflection attenuation by surface plasmon is described hereinafter. Because the light ray L1 is incident on the metal film 5 at the angle satisfying the condition of total reflection, evanescent light is generated on the surface of the metal film 5 on the dielectric layer 7 side, and surface plasmon is excited on the interface between the metal film 5 and the dielectric layer 7. When the frequency of the surface plasmon and the frequency of the evanescent wave match, they are in the resonance state. Then, the light energy is transferred to the surface plasmon, so that the intensity of light that is totally reflected on the interface between the metal film 5 and the prism 4 is attenuated. In this manner, the phenomenon that the energy of light incident on the metal film 5 is transferred to the surface plasmon and the intensity of light reflected on the metal film 5 is attenuated is called total reflection attenuation by surface plasmon (or surface plasmon resonance).

The degree of total reflection attenuation by surface plasmon is affected by the dielectric constant distribution in the dielectric layer 7. The light emitted from the LED 1 is affected by the dielectric constant distribution in the dielectric layer 7 when it is reflected on the interface between the prism 4 and the metal film 5. Then, the intensity distribution of light reflected on the interface changes from a prescribed light intensity distribution to a distribution corresponding to the dielectric constant distribution of the dielectric layer 7. Therefore, by observing the intensity distribution of light reflected on the interface between the metal film 5 and the prism 4, it is possible to observe the dielectric constant distribution in the dielectric layer 7, thereby allowing indirect observation of a thermal image indicating the intensity distribution of infrared light input from the outside.

As shown in FIG. 4, the dummy thermal region is set to the laminate 6, and the dummy pixel region is set to the image pickup device 9. An output signal from the dummy pixel region corresponds to an ambient component that occurs according to the environment to use the infrared camera 50. An output signal from the effective pixel region is a signal in which a thermal image component is superimposed onto the ambient component. Thus, by obtaining a difference between the output signal in the effective pixel region and the output signal in the dummy pixel region, it is possible to acquire a clearer thermal image.

FIG. 5 is a graph showing the dependence of the incident angle α on the intensity of reflected light. The reflected light intensity is set based on an output voltage value (output signal value) from the image pickup device 9. As shown in FIG. 5, the intensity of reflected light that is totally reflected on the interface between the metal film 5 and the prism 4 depends on the incident angle α (cf. FIG. 1). In this example, the incident angle α is set to a fixed value, 45 degrees, by placing the polarizing plate 3, the lens 2 and the LED 1 on the axis line AX1.

Further, as shown in FIG. 5, a difference corresponding to the degree of total reflection attenuation by surface plasmon occurs between an output voltage value from an effective pixel (a pixel in the effective pixel region) and an output voltage value from a dummy pixel (a pixel in the dummy pixel region). Therefore, by obtaining a difference between the output voltage value from the dummy pixel and the output voltage value from the effective pixel, it is possible to acquire the intensity value of infrared ray from which an ambient component is eliminated. A thermal image can be thereby generated based on the output voltage value of each effective pixel.

With the principle of operation described above, the infrared camera 50 acquires the intensity distribution of reflected light from the interface between the metal film 5 and the prism 4 by the image pickup device 9, thereby acquiring the intensity distribution (thermal image) of infrared light input from the outside.

The overview of the operation of the signal processing section 40 is described hereinafter with reference to FIG. 6. First, the signal processing section 40 acquires an image from the image pickup device 9 (S1). Specifically, the signal processing section 40 causes each pixel of the image pickup device 9 to output a voltage signal according to the amount of incident light.

Next, the signal processing section 40 eliminates an ambient component from the acquired image. Specifically, the signal processing section 40 calculates a difference between the output voltage value (output signal value) from the dummy pixel and the output voltage value (output signal value) from the effective pixel. A difference value may be obtained after averaging the output voltage value from the dummy pixel and the output voltage value from the effective pixel. Alternatively, a difference value between the output voltage value from the effective pixel and the output voltage value from the dummy pixel may be obtained for each corresponding row.

Then, the signal processing section 40 outputs the image from which the ambient component is eliminated to the display section 41 (S3). As a result of such a flow, a thermal image is displayed on the display section 41. By observing the displayed thermal image, a user of the infrared camera 50 can perform monitoring activity such as identifying a suspicious person and identifying a dangerous material. Mounting the infrared camera 50 on a vehicle enables detection of whether living matter exists in front of the vehicle.

In this embodiment, a thermal image is acquired with the use of total reflection attenuation by surface plasmon as described above. This achieves the infrared camera of a novel, uncooled type without a complicated structure. Further, with a mechanism of eliminating an ambient component by the dummy thermal region and the dummy pixel region, it is possible to acquire a clearer thermal image.

The infrared camera 50 is mostly composed of parts that are available at relatively low costs, such as the LED 1 and the image pickup device 9. It is thereby possible to achieve significant cost reduction compared with existing infrared cameras.

Second Embodiment

Figure 7:
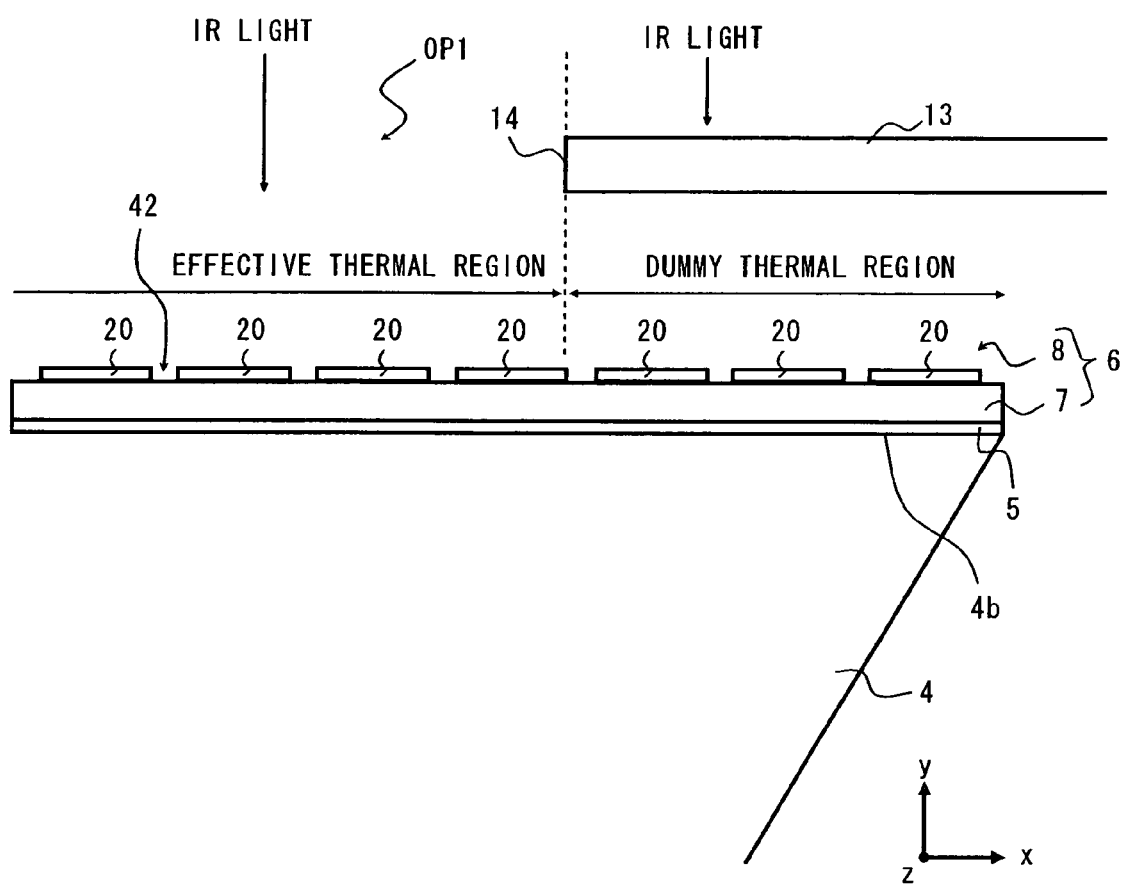
FIG. 7 is an explanatory view illustrating the structure of a laminate 6 on the front surface 4b of a prism 4 according to a second embodiment of the present invention.
Figure 8:
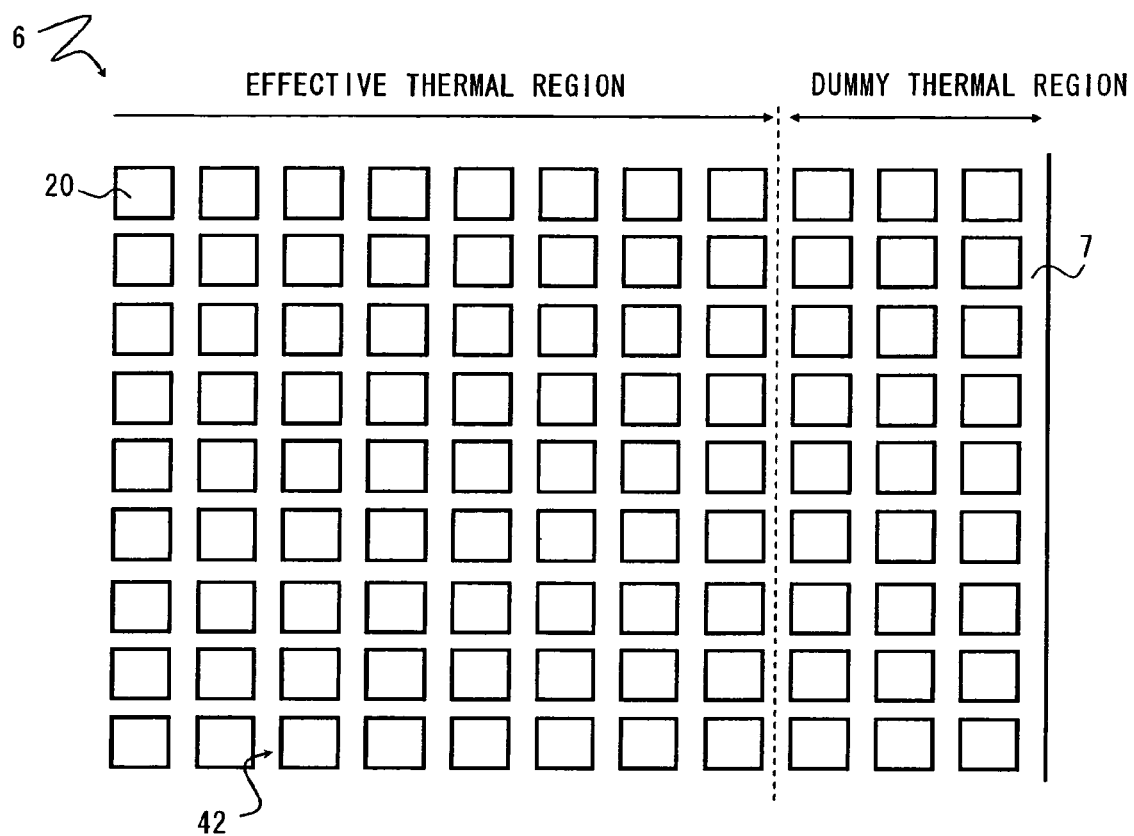
FIG. 8 is an explanatory view showing the front surface 4b of the prism 4 on which the laminate 6 is formed, viewed from the front.

A second embodiment of the present invention is described hereinafter with reference to FIGS. 7 and 8. FIG. 7 is an explanatory view illustrating the structure of the laminate 6 on the front surface 4b of the prism 4. FIG. 8 is an explanatory view showing the front surface 4b of the prism 4 on which the laminate 6 is formed, viewed from the front.

In this embodiment, the infrared light absorbing layer 8 is divided into a plurality of pieces by a plurality of grooves 42, which is different from the first embodiment. It is thereby possible to further increase the clearness of a finally obtained thermal image compared with the first embodiment. The advantage described in the first embodiment is the same for this embodiment as well.

Referring to FIG. 7, the infrared light absorbing layer 8 is divided into a plurality of pieces (infrared light absorbing lands) 20 by the plurality of grooves 42. The grooves 42 extend substantially parallel to the front surface 4b of the prism 4.

Referring to FIG. 8, the infrared light absorbing layer 8 is divided into the plurality of infrared light absorbing lands 20 that are arranged in matrix by the plurality of grooves 42 that are formed like a lattice. By dividing the infrared light absorbing layer 8 into the plurality of infrared light absorbing lands 20, it is possible to further increase the clearness of a finally obtained thermal image. This is because heat generated in a given infrared light absorbing land 20 is blocked by the groove 42 and not transferred to the adjacent infrared light absorbing land 20, so that it is effectively transferred to the dielectric layer 7.

The infrared light absorbing lands 20 are island portions that are separated from each other, each having a rectangular shape corresponding to each pixel of the image pickup device 9. It is thereby possible to finally obtain a clearer thermal image.

Third Embodiment

Figure 9:
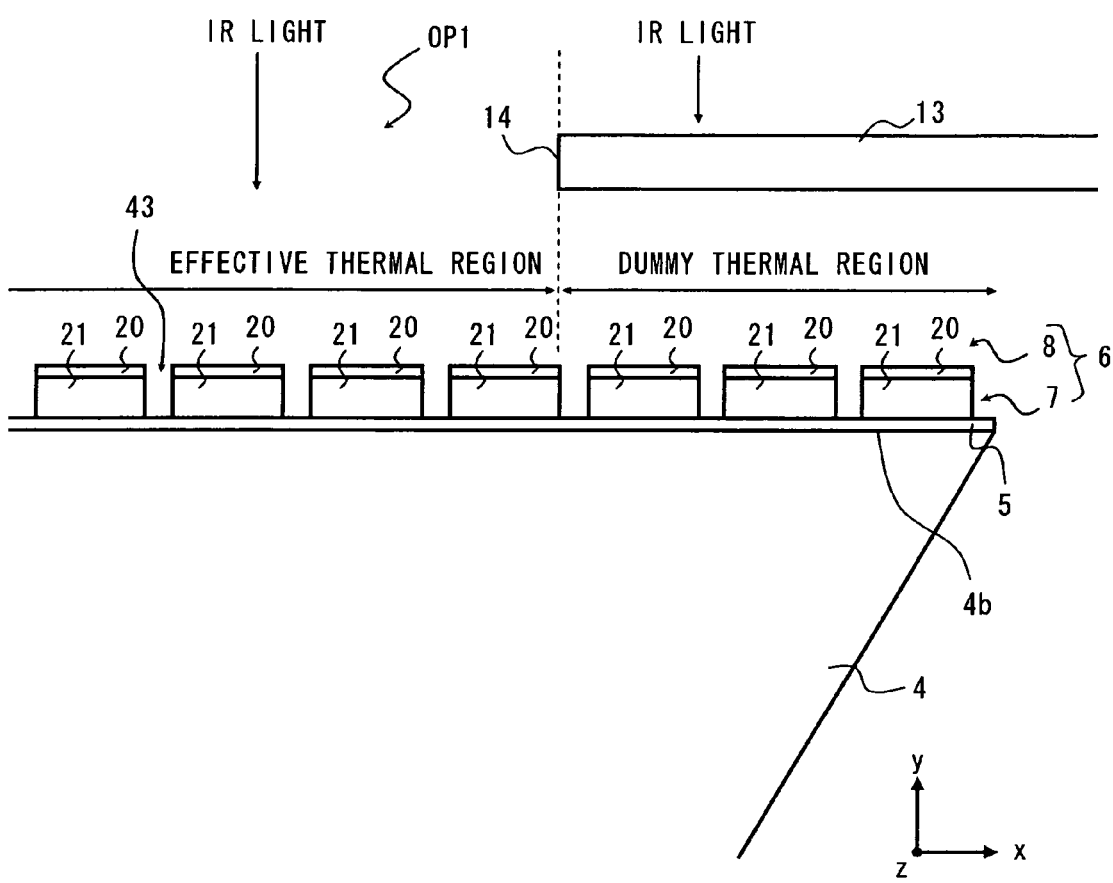
FIG. 9 is an explanatory view illustrating the structure of the laminate 6 on the front surface 4b of the prism 4 according to a third embodiment of the present invention.
Figure 10:
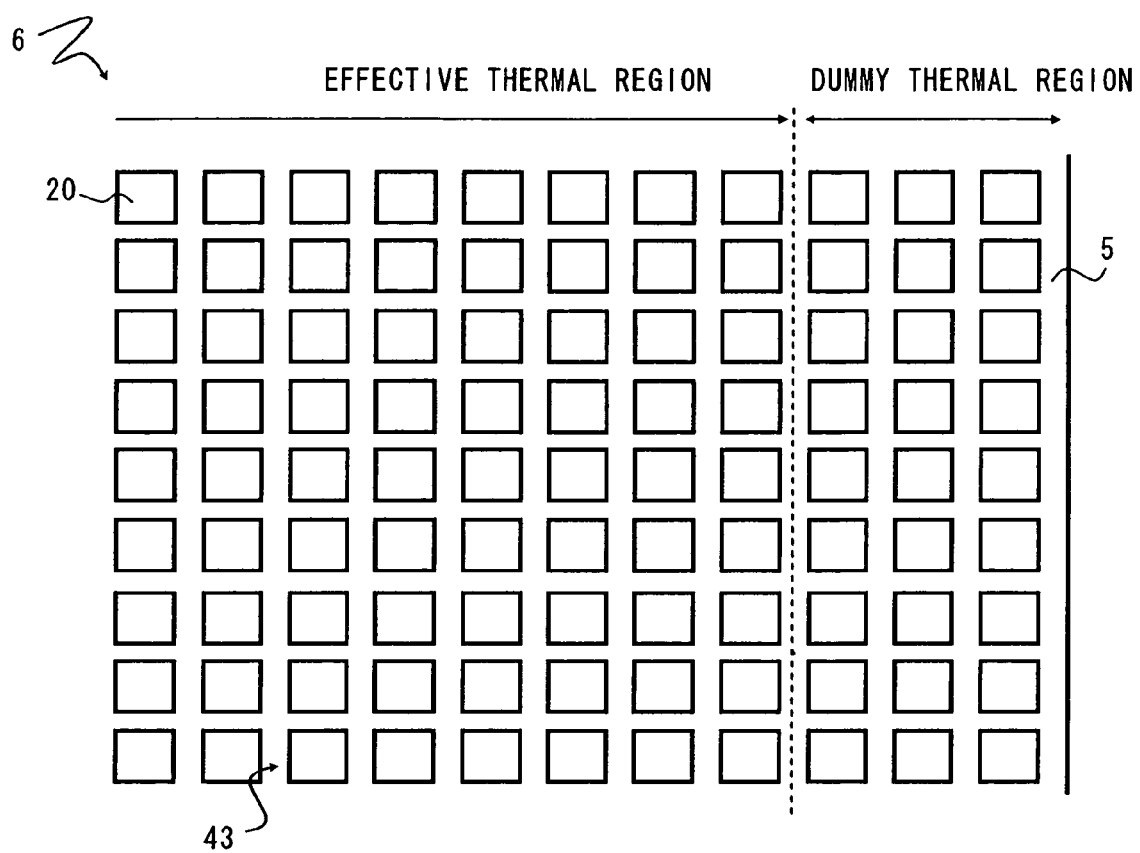
FIG. 10 is an explanatory view showing the front surface 4b of the prism 4 on which the laminate 6 is formed, viewed from the front.

A third embodiment of the present invention is described hereinafter with reference to FIGS. 9 and 10. FIG. 9 is an explanatory view illustrating the structure of the laminate 6 on the front surface 4b of the prism 4. FIG. 10 is an explanatory view showing the front surface 4b of the prism 4 on which the laminate 6 is formed, viewed from the front.

In this embodiment, the infrared light absorbing layer 8 and the dielectric layer 7 are divided into a plurality of pieces by a plurality of grooves 43, which is different from the second embodiment. It is thereby possible to further increase the clearness of a finally obtained thermal image compared with the second embodiment. The advantage described in the second embodiment is the same for this embodiment as well.

Referring to FIG. 9, the infrared light absorbing layer 8 is divided into a plurality of pieces (infrared light absorbing lands) 20 by the plurality of grooves 43. Likewise, the dielectric layer 7 is divided into a plurality of pieces (dielectric lands) 21 by the plurality of grooves 43. The grooves 43 extend substantially parallel to the front surface 4b of the prism 4.

Referring to FIG. 10, the infrared light absorbing layer 8 is divided into the plurality of infrared light absorbing lands 20 that are arranged in matrix by the plurality of grooves 43 that are formed like a lattice. Likewise, the dielectric layer 7 is divided into the plurality of dielectric lands 21 that are arranged in matrix. By dividing the dielectric layer 7 in addition to the infrared light absorbing layer 8 into the plurality of pieces, it is possible to further increase the clearness of a finally obtained thermal image. This is because heat transferred from a given infrared light absorbing land 20 to a given dielectric land 21 is blocked by the groove 43 to reduce the amount of heat to be transferred to the adjacent dielectric land 21. Some heat is transferred to the adjacent dielectric land 21 through the metal film 5.

Fourth Embodiment

Figure 11:
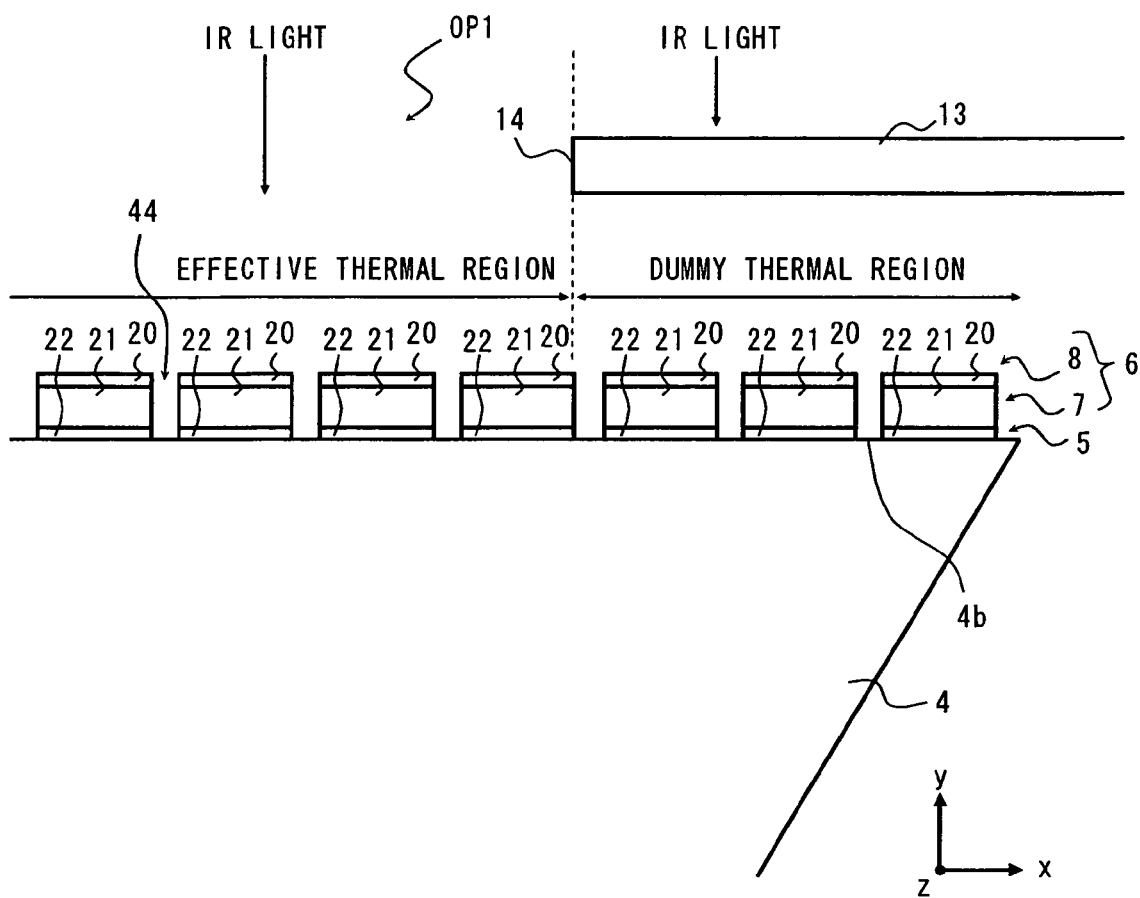
FIG. 11 is an explanatory view illustrating the structure of the laminate 6 on the front surface 4b of the prism 4 according to a fourth embodiment of the present invention.
Figure 12:
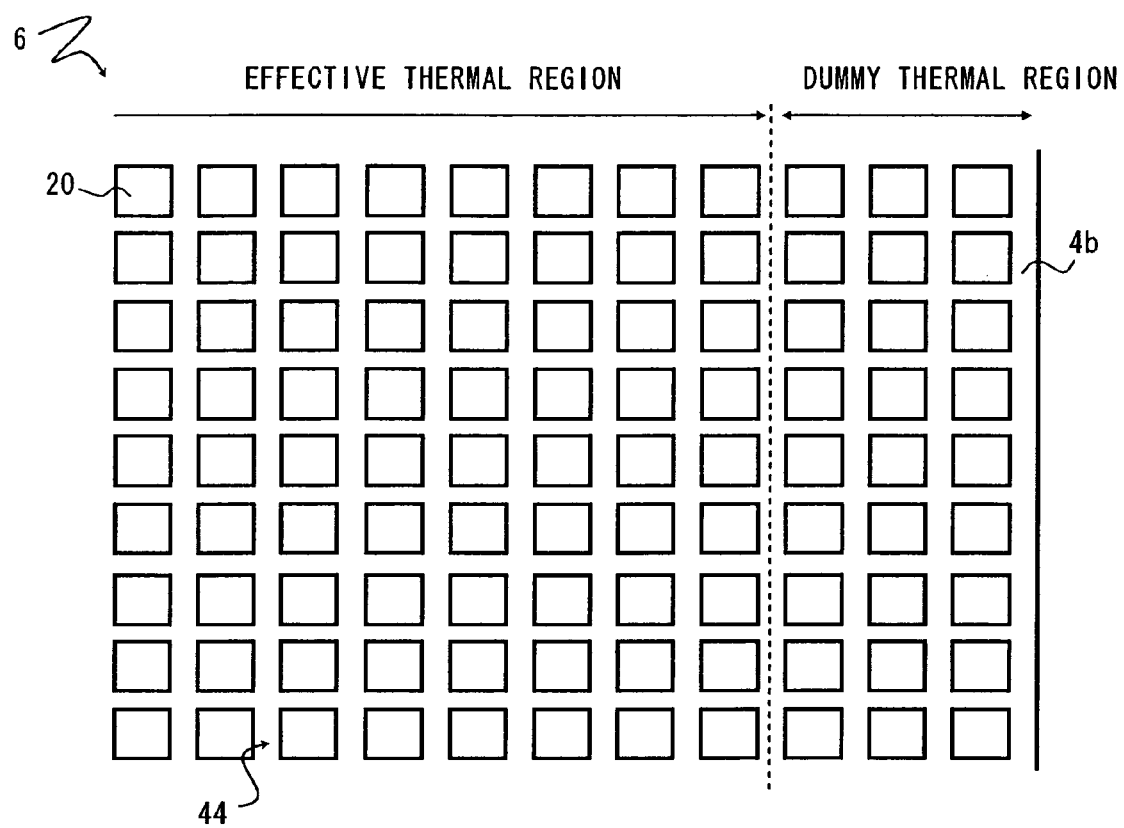
FIG. 12 is an explanatory view showing the front surface 4b of the prism 4 on which the laminate 6 is formed, viewed from the front.

A fourth embodiment of the present invention is described hereinafter with reference to FIGS. 11 and 12. FIG. 11 is an explanatory view illustrating the structure of the laminate 6 on the front surface 4b of the prism 4. FIG. 12 is an explanatory view showing the front surface 4b of the prism 4 on which the laminate 6 is formed, viewed from the front.

In this embodiment, the infrared light absorbing layer 8, the dielectric layer 7 and the metal film 5 are divided into a plurality of pieces by a plurality of grooves 44, which is different from the third embodiment. It is thereby possible to further increase the clearness of a finally obtained thermal image compared with the third embodiment. The advantage described in the third embodiment is the same for this embodiment as well.

Referring to FIG. 11, the infrared light absorbing layer 8 is divided into a plurality of pieces (infrared light absorbing lands) 20 by the plurality of grooves 44. Likewise, the dielectric layer 7 is divided into a plurality of pieces (dielectric lands) 21 by the plurality of grooves 44. Further, the metal film 5 is divided into a plurality of pieces (metal lands) 22 by the plurality of grooves 44. The grooves 44 extend substantially parallel to the front surface 4b of the prism 4.

Referring to FIG. 12, the infrared light absorbing layer 8 is divided into the plurality of infrared light absorbing lands 20 that are arranged in matrix by the plurality of grooves 44 that are formed like a lattice. Likewise, the dielectric layer 7 is divided into the plurality of dielectric lands 21 that are arranged in matrix. Likewise, the metal film 5 is divided into the plurality of metal lands 22 that are arranged in matrix. By dividing the metal film 5 in addition to the dielectric layer 7 into the plurality of pieces, it is possible to further increase the clearness of a finally obtained thermal image. Specifically, because the metal film 5 is divided into the plurality of metal lands 22, it is possible to prevent heat from being transferred from a given dielectric land 21 to another dielectric land 21 through the metal film 5. Since the metal film 5 has high thermal conductivity, it is possible to significantly increase the clearness of a finally obtained thermal image by dividing the metal film 5 into the plurality of metal lands 22.

Fifth Embodiment

Figure 13:
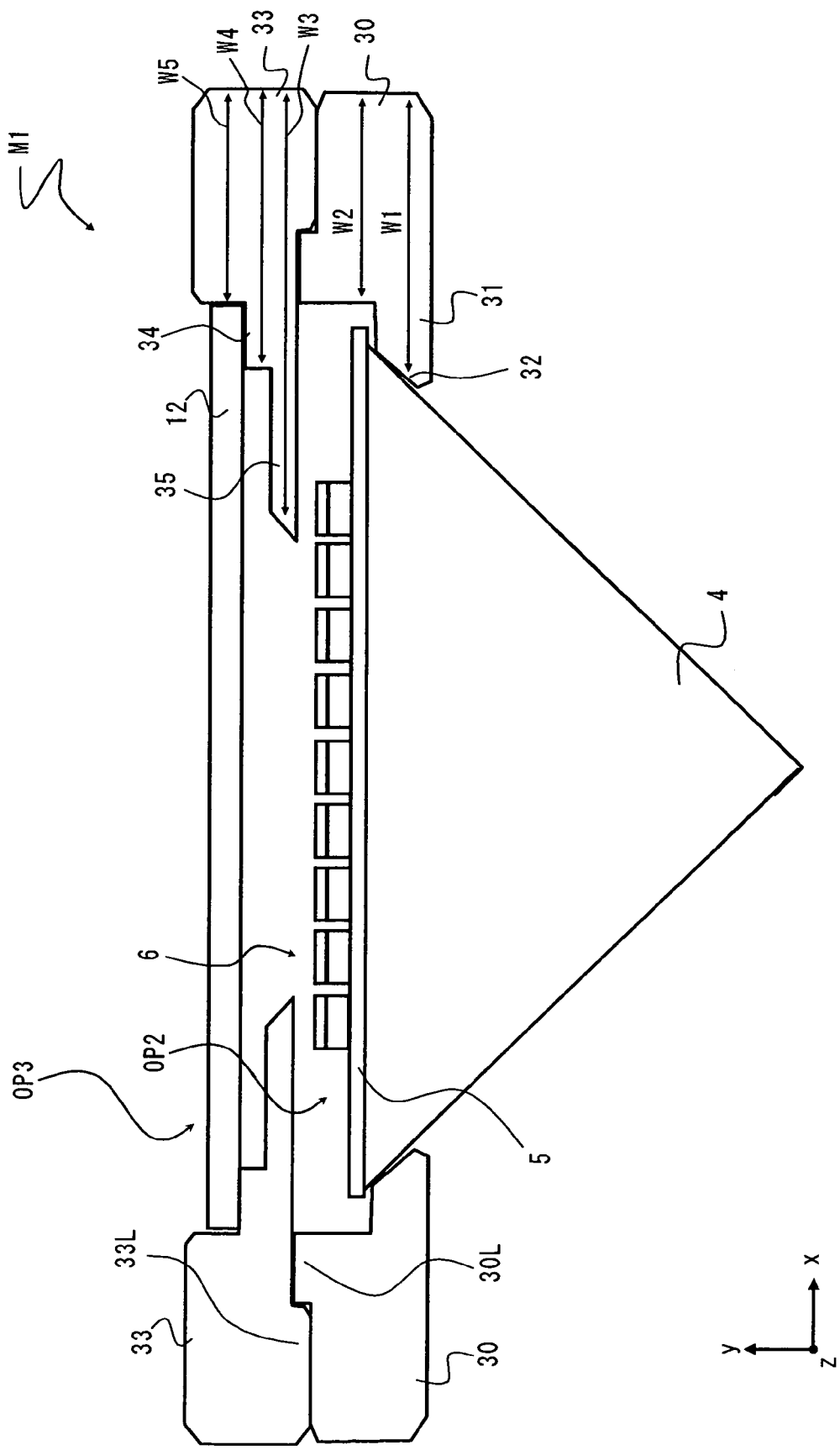
FIG. 13 is a view illustrating the cross-sectional structure of a conversion module incorporated into an infrared camera according to a fifth embodiment of the present invention.
Figure 14:
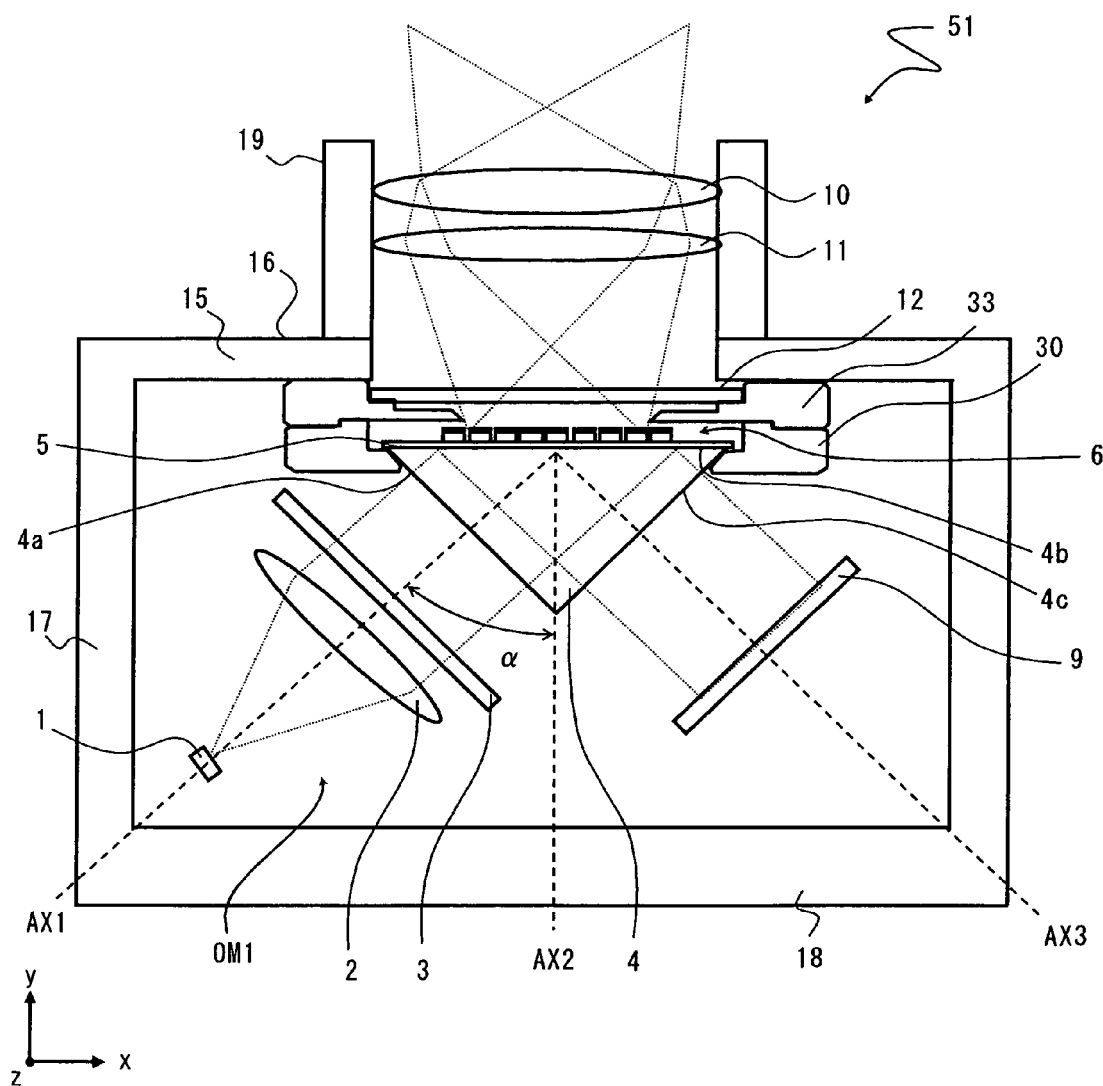
FIG. 14 is a view illustrating the structure of the infrared camera into which the conversion module is incorporated.

A fifth embodiment of the present invention is described hereinafter with reference to FIGS. 13 and 14. FIG. 13 is a view illustrating the cross-sectional structure of a conversion module that is incorporated into the infrared camera. FIG. 14 is a view illustrating the structure of the infrared camera into which the conversion module is incorporated.

Referring to FIG. 13, the conversion module M1 includes the prism 4, the metal film 5, the laminate 6 and the filter 12. The conversion module M1 further includes a lower support member 30 and an upper support member 33.

The lower support member 30 is a circular plate member having an opening OP2 at its center. The lower support member 30 has a thick material portion with a plate thickness W1 and a thin material portion with a plate thickness W2, where W1>W2. By a difference in material thickness in the thickness direction, the lower support member 30 has a protrusion 31 that projects from the inner wall to the inside of the opening OP2. An end 32 of the protrusion 31 is in contact with the left back surface or the right back surface of the prism 4. In such a mechanism, the lower support member 30 mechanically supports the prism 4. The laminate 6 is placed inside the opening OP2 of the lower support member 30.

The upper support member 33 is a circular plate member having an opening OP3 at its center. The upper support member 33 has a thick material portion with a plate thickness W3, an intermediate material portion with a plate thickness W4 and a thin material portion with a plate thickness W5, where W3>W4>W5. By a difference in material thickness between W3 and W4, the upper support member 33 has a protrusion (first protrusion) 35 that projects from the inner wall to the inside of the opening OP3. Further, by a difference in material thickness between W4 and W5, the upper support member 33 has a protrusion (second protrusion) 34 that projects from the inner wall to the inside of the opening OP3.

The filter 12 is placed on the protrusion 34 and fixed to the protrusion 34 by a general bonding means (bonding member). The filter 12 is thereby placed in the opening OP3 of the upper support member 33. Further, the protrusion 35 extends to the area where the laminate 6 is formed when viewed form above as shown in FIG. 13. Thus, in this embodiment, the protrusion 35 that is formed on the upper support member 33 functions as a shielding means (cover) that shields infrared light that is input from the outside.

The upper support member 33 and the lower support member 30 are piled with each other and positioned with respect to each other. In this example, a protrusion 33L (fitting portion) that is formed on the under surface of the upper support member 33 and a protrusion 30L (fitting portion) that is formed on the top surface of the lower support member 30 fit with each other. The upper support member 33 and the lower support member 30 are thereby piled and positioned with respect to each other. Then, the protrusion 35 is positioned with respect to the formation area of the laminate 6, so that the effective thermal region and the dummy thermal region are set suitably.

The upper support member 33 and the lower support member 30 may be made of a general resin material (epoxy resin, polyamide etc.), for example. In order to secure the positioning between the upper support member 33 and the lower support member 30, their facing surfaces may be fixed by a bonding agent or the like.

In this manner, by packaging the laminate 6 by the upper support member 33 and the lower support member 30, it is possible to enhance the heat shielding properties from the outside by reducing the pressure or forming a vacuum inside or filling the inert gas inside.

FIGS. 4-14 shows an infrared camera 51 into which the above-described conversion module M1 is incorporated. By configuring the components of the infrared camera 51 as a module for each part, it is possible to facilitate the assembly of the infrared camera 51. In this example, the top surface of the upper support member 33 is fixed to the inner surface of the cover plate 16 by a general fixing means (bonding, fitting etc.).

In this embodiment, the laminate 6 is packaged by the upper support member 33 and the lower support member 30 as described above. It is thereby possible to increase the heat shielding properties from the outside and facilitate the assembly.

Sixth Embodiment

Figure 15:
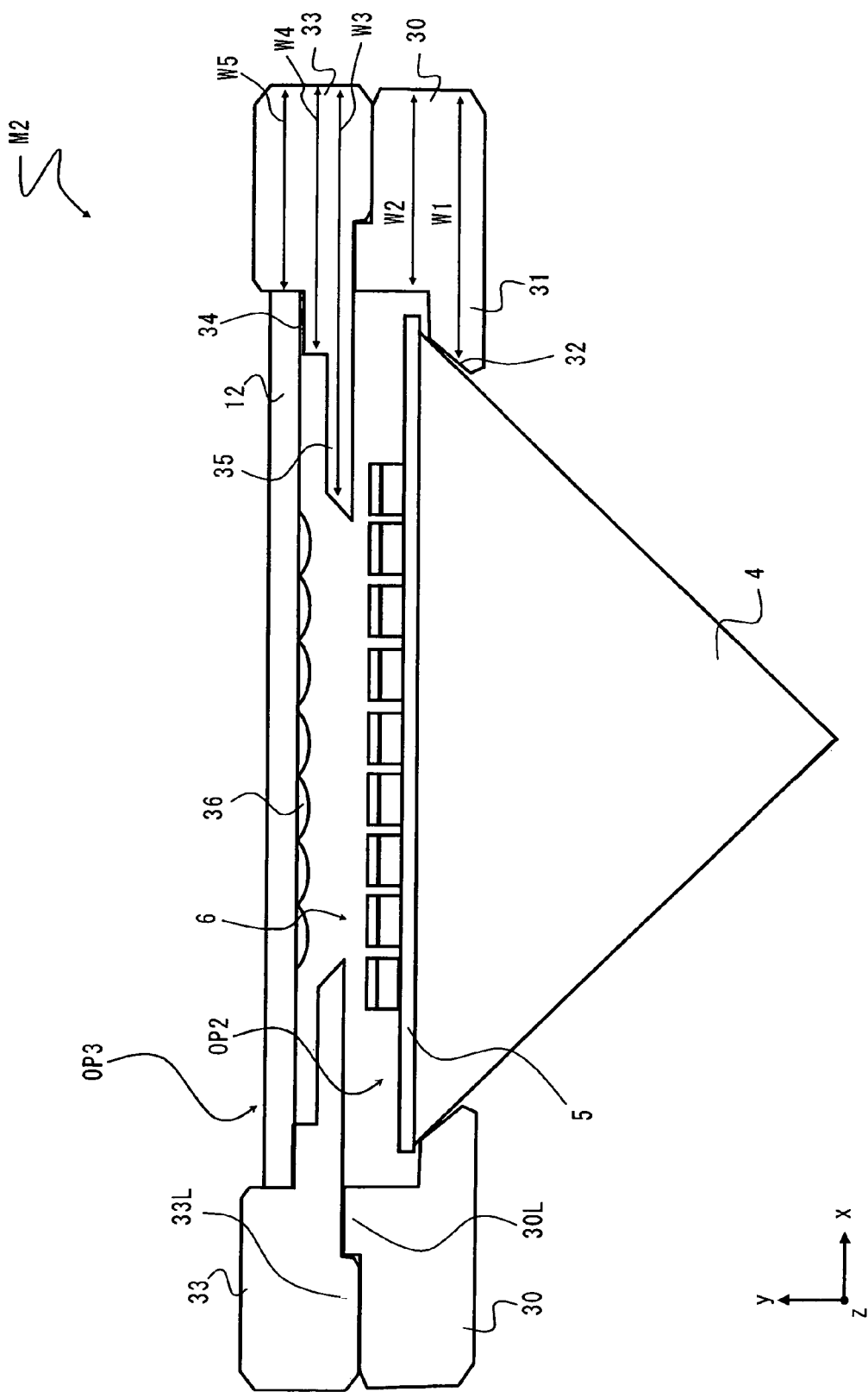
FIG. 15 is a view illustrating the cross-sectional structure of a conversion module incorporated into an infrared camera according to a sixth embodiment of the present invention.

A sixth embodiment of the present invention is described hereinafter with reference to FIG. 15. FIG. 15 is a view illustrating the cross-sectional structure of a conversion module incorporated into an infrared camera.

In the conversion module M2 according to this embodiment, a plurality of convex lenses 36 are formed on the under surface of the filter 12. This increases the clearness of a finally obtained thermal image. This is because infrared light input from the outside is condensed by the convex lenses 36 and thereby heat is transferred in a narrower region, so that thermal diffusion in a unit region is suppressed.

In addition to the advantage described above, the same advantage as described in the fifth embodiment is obtained in this embodiment. Further, the convex lenses 36 may be formed on a plate member different from the filer 12 and incorporated into the conversion module. In this case, however, the thickness of the conversion module increases.

Seventh Embodiment

Figure 16:
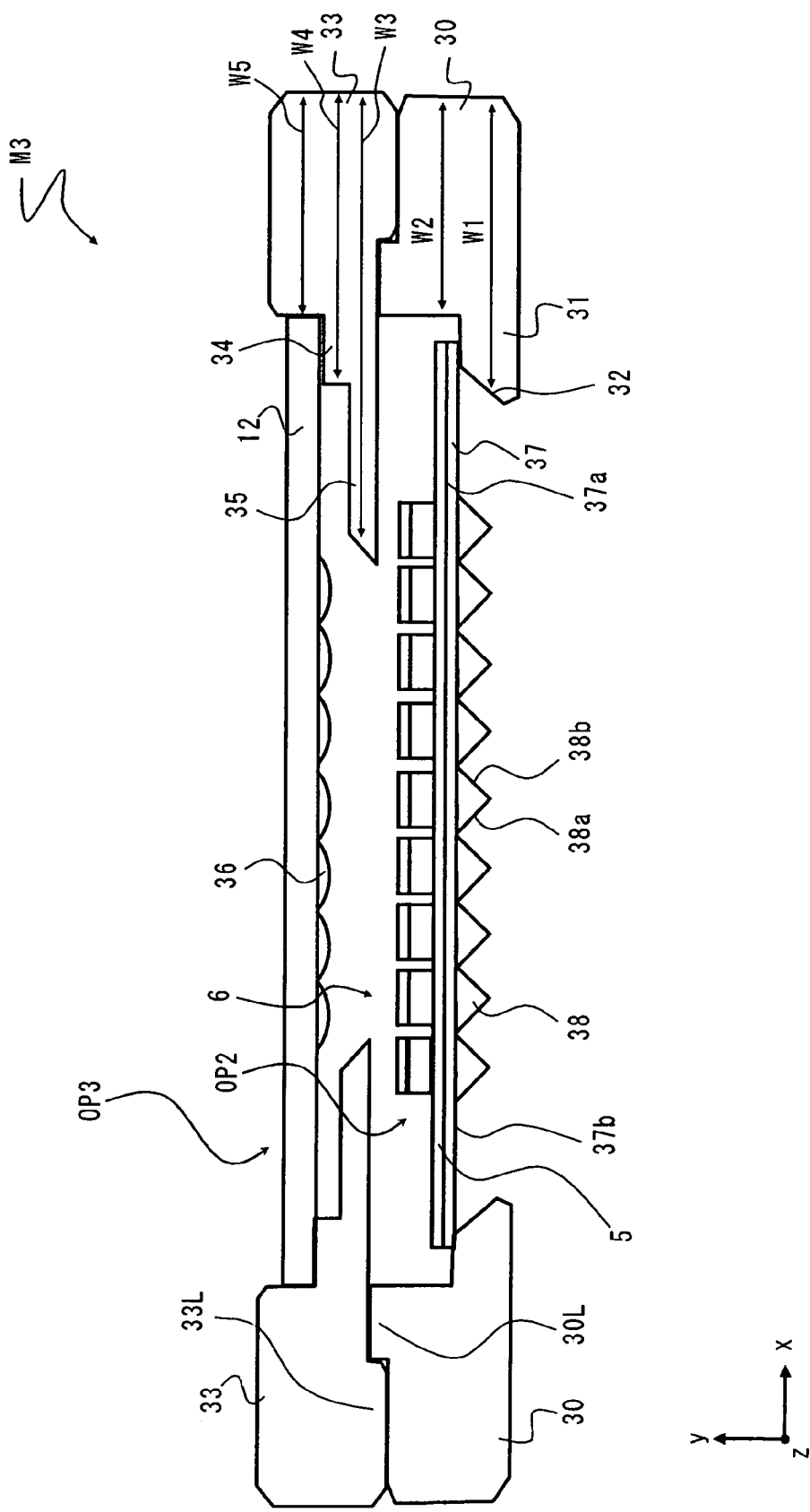
FIG. 16 is a view illustrating the cross-sectional structure of a conversion module incorporated into an infrared camera according to a seventh embodiment of the present invention.

A seventh embodiment of the present invention is described hereinafter with reference to FIG. 16. FIG. 16 is a view illustrating the cross-sectional structure of a conversion module incorporated into an infrared camera.

In the conversion module M3 according to this embodiment, the prism 4 is divided into a plurality of prisms (projecting portions) 38. The plurality of prisms 38 are arranged with no space therebetween on a back surface 37b of a plate member 37 that is transparent to light emitted from the LED 1. By dividing the prism into a plurality of prisms, it is possible to reduce the thickness of the prism and enable further downsizing of the infrared camera, in addition to offer the advantage described in the sixth embodiment. The metal film 5, the laminate 6 and so on are placed on a front surface 37a of the plate member 37.

Each prism 38 has a left back surface 38a and a right back surface 38c. The light that is emitted from the LED 1, parallelized by the lens 2 and converted into p-polarized light by the polarizing plate 3 is input to the prism 38 through the left back surface 38a. In other words, the left back surface 38a of the prism 38 functions as an input surface of the light from the LED 1.

The light that is input to the prism 38 through the left back surface 38a and is totally reflected on the interface between the front surface 37a of the plate member 37 and the metal film 5 is output from the prism 38 through the right back surface 38c. In other words, the right back surface 38c of the prism 38 functions as an output surface of the light reflected on the interface between the front surface 37a of the plate member 37 and the metal film 5.

Eighth Embodiment

An eighth embodiment of the present invention is described hereinafter with reference to FIGS. 17 to 23I.

Figure 17:
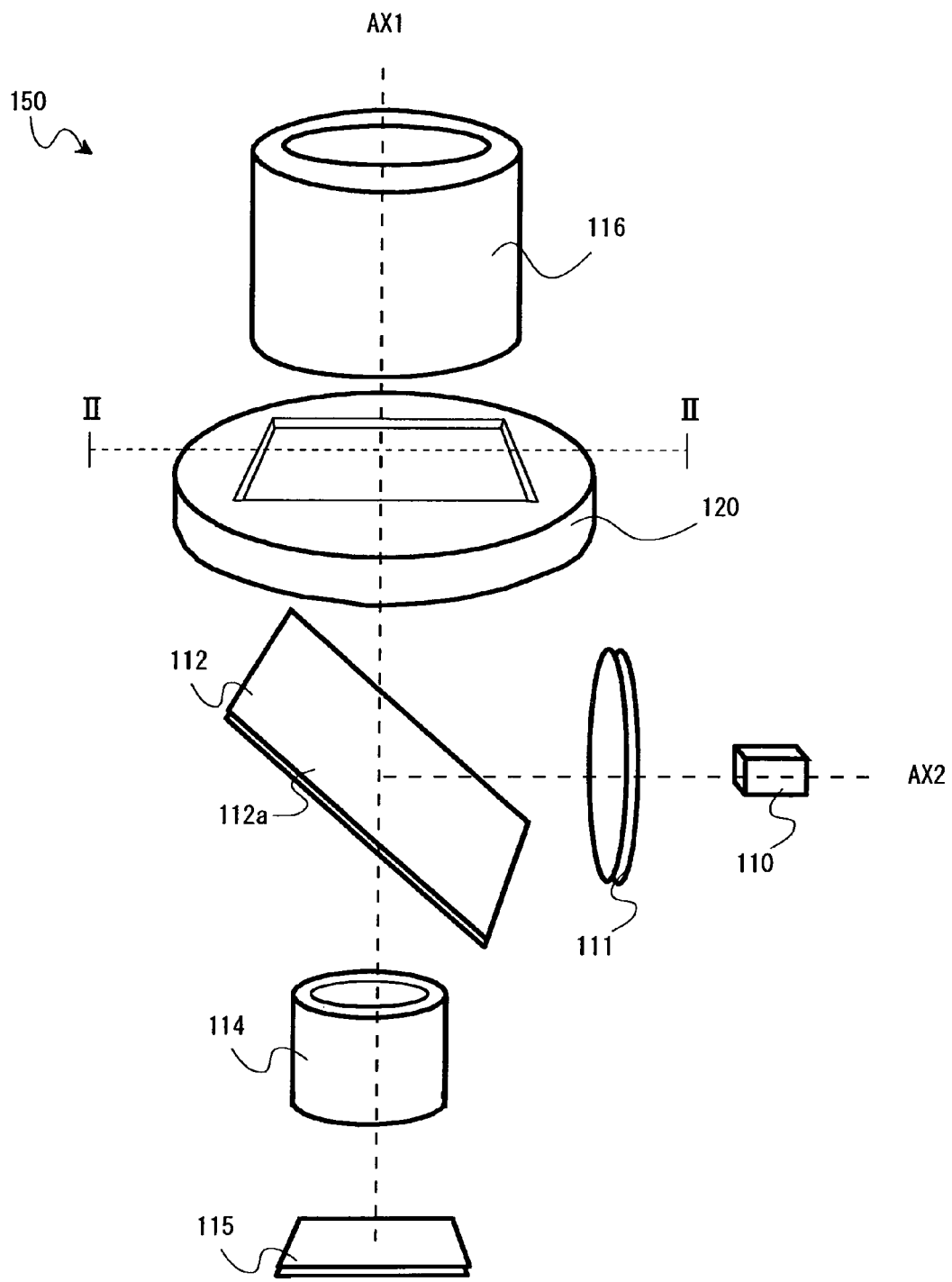
FIG. 17 is a view illustrating the schematic structure of an infrared camera 150 according to an eighth embodiment of the present invention.
Figure 18:
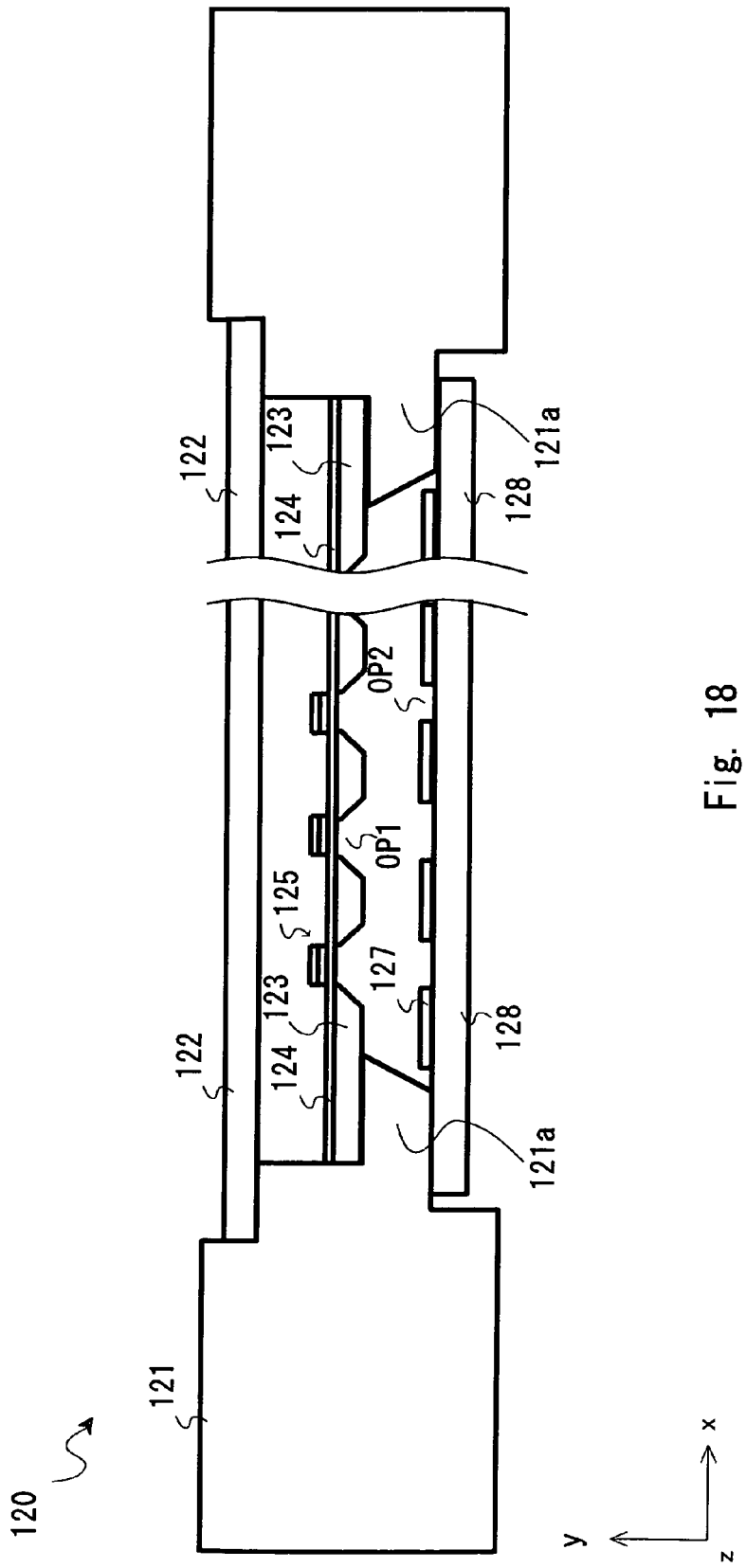
FIG. 18 is a view showing the schematic cross-sectional structure of a conversion module according to the eighth embodiment of the present invention.
Figure 19:
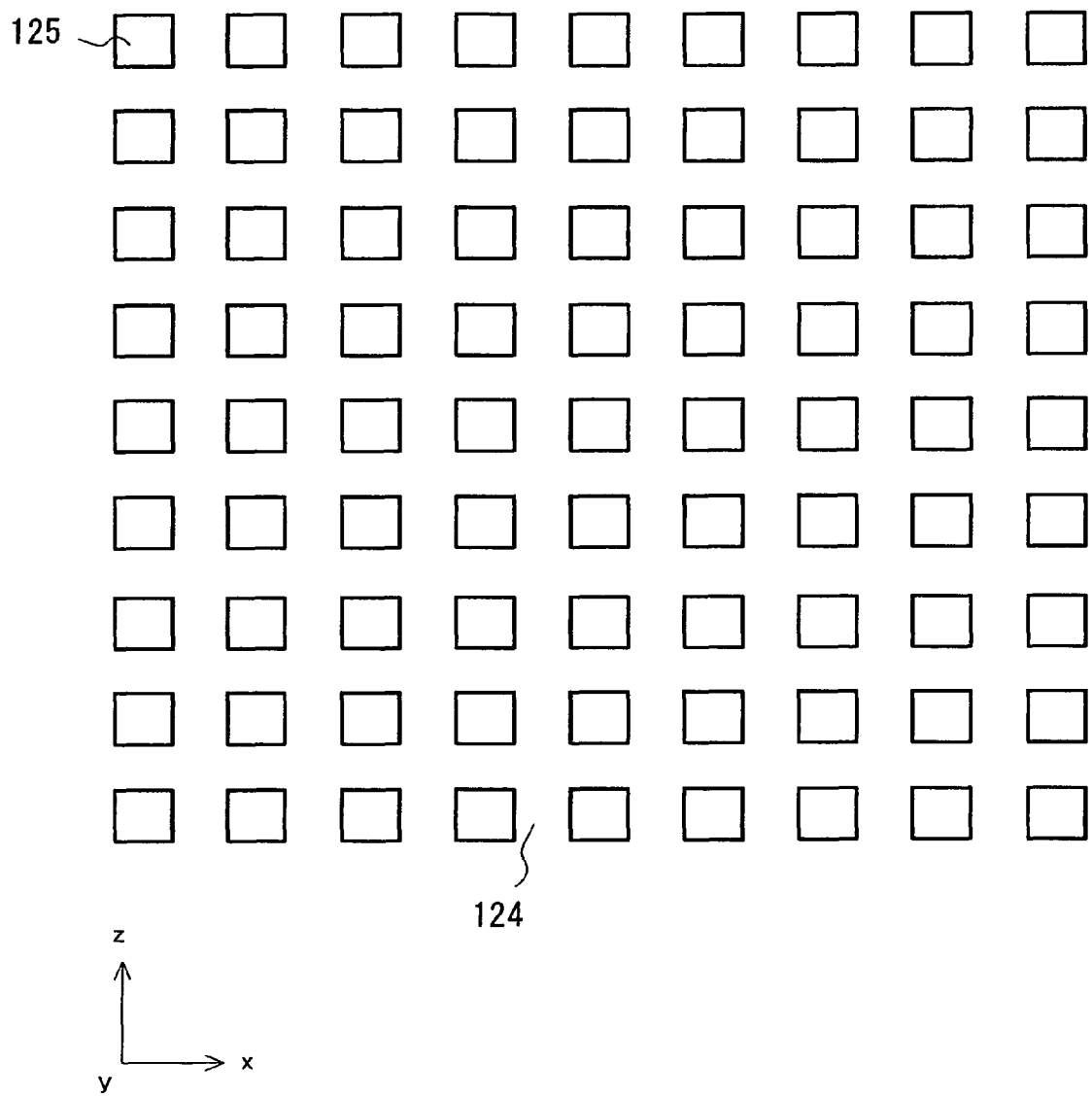
FIG. 19 is a view showing a laminate formed in-plane according to the eighth embodiment of the present invention.
Figure 20:
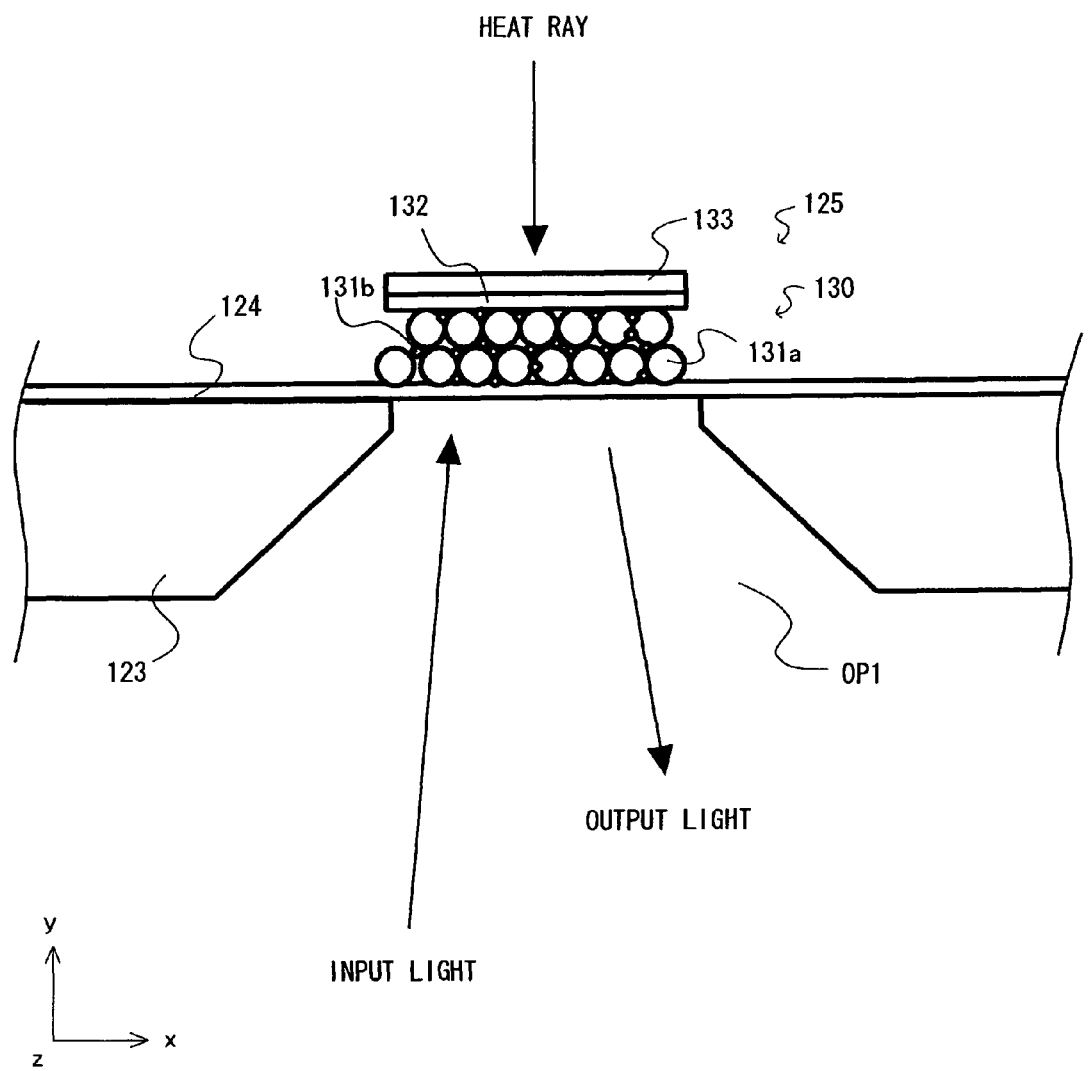
FIG. 20 is a view showing the cross-sectional structure of a conversion apparatus according to the eighth embodiment of the present invention.
Figure 21:
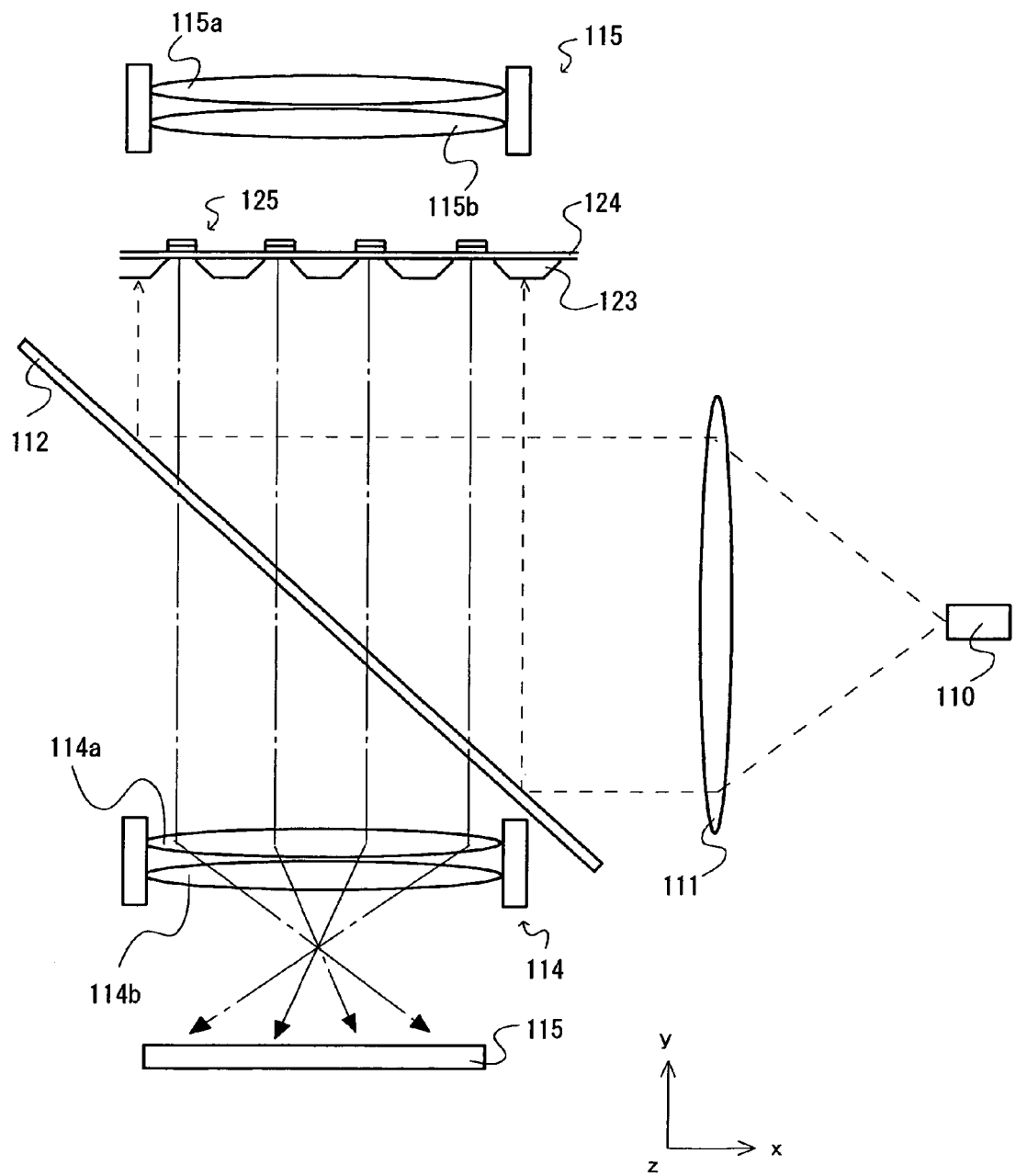
FIG. 21 is an explanatory view illustrating the function of the infrared camera 150 according to the eighth embodiment of the present invention.
Figure 22:
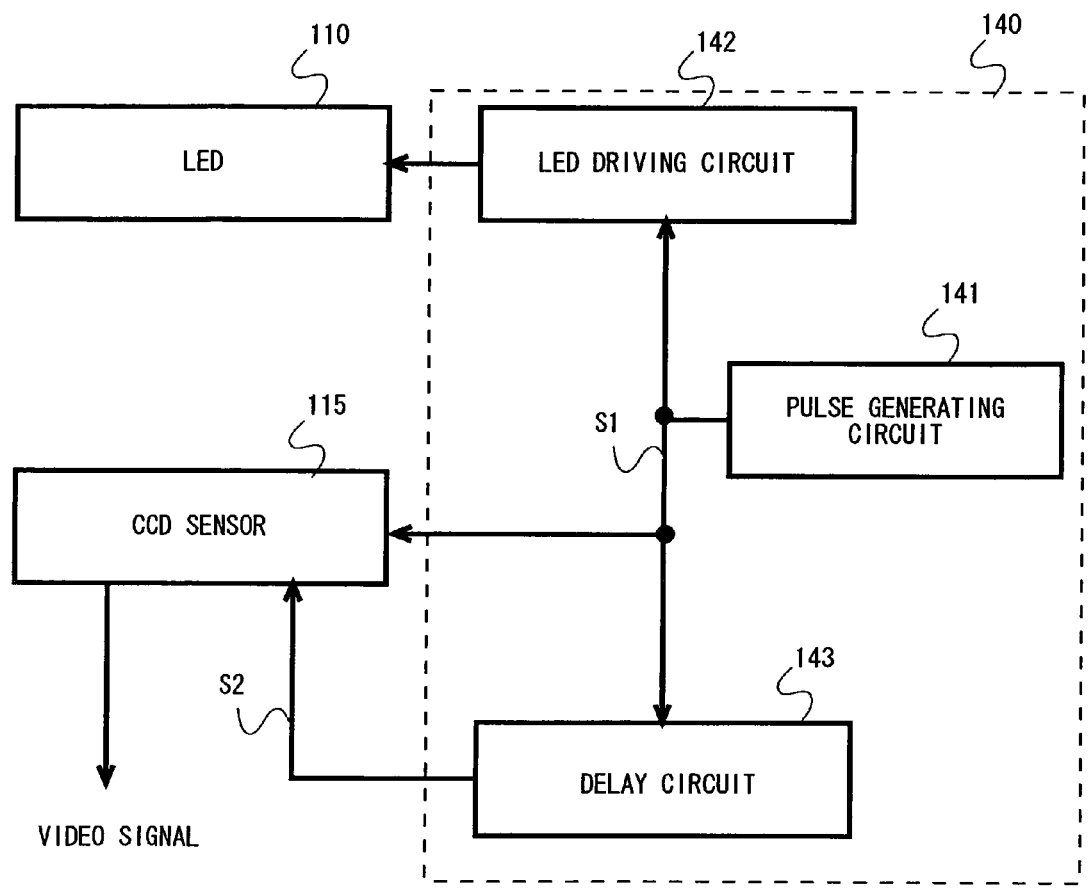
FIG. 22 is a block diagram showing the schematic configuration of a driving section connected to the infrared camera 150 according to the eighth embodiment of the present invention.

FIG. 17 is a view illustrating the schematic structure of an infrared camera 150. FIG. 18 is a view showing the schematic cross-sectional structure of a conversion module. FIG. 19 is a view showing a laminate formed in-plane. FIG. 20 is a view showing the cross-sectional structure of a conversion apparatus. FIG. 21 is an explanatory view illustrating the function of the infrared camera 150. FIG. 22 is a block diagram showing the schematic configuration of a driving section connected to the infrared camera 150. FIGS. 23A to 23I are the schematic procedural flow charts showing a manufacturing method of the conversion apparatus.

Referring to FIG. 17, the infrared camera (image acquisition apparatus) 150 includes a LED 110, a lens 111, a half mirror 112, a lens barrel 114, a CCD sensor 115, a lens barrel 116 and a conversion module 120.

The infrared camera 150 receives infrared light (radiant heat ray from an object) input through the lens barrel 116 on the front surface of the conversion module 120. Further, the infrared camera 150 receives light emitted from the LED 110 on the back surface of the conversion module 120. As described later, the conversion module 120 includes a black layer (heat ray absorbing layer) formed on the front side and a dielectric layer formed on the back side. The dielectric layer is formed by dielectric particles (dielectrics) on which surfaces metal particles (conductive particles) are attached and capable of generating localized plasmon resonance. The dielectric layer is thermally connected to the black layer. Thus, the degree of light attenuation by the localized plasmon resonance corresponds to the intensity of infrared light incident on the black layer. Thus, the intensity distribution of light output from the conversion module 120 corresponds to the intensity distribution of the infrared light input to the conversion module 120.

The light output from the conversion module 120 passes through the half mirror 112 and then through lens barrel 114, and is incident on an image pickup surface of the CCD sensor

115. The CCD sensor 115 receives the light having the intensity distribution corresponding to the intensity distribution of the infrared light by a plurality of pixels and captures an image corresponding to the intensity distribution of the infrared light. In this manner, it is possible to provide the infrared camera 150 of a novel type with a simple structure using general-purpose parts.

As shown in FIG. 17, the lens barrel 114, the half mirror 112, the conversion module 120 and the lens barrel 116 are placed on top of one another in this order on the image pickup surface of the CCD sensor 115. The lens 111 and the LED 110 are placed on top of one another on the front surface 112*a* of the half mirror 112. Alternatively, the LED 110 and the lens 111 may be placed on the axis line AX1, and the lens barrel 114 and the CCD sensor 115 may be placed on the axis line AX2.

The LED 110 is a general semiconductor light emitting device (light source) that emits light with a prescribed wavelength according to a drive current. The emission wavelength of the LED 110 is arbitrary. The polarization state of light emitted from the LED 110 is also arbitrary. Instead of the LED, a LD (Laser Diode) may be used.

The lens 111 parallelizes the light emitted from the LED 110. The light emitted from the LED 110 is parallelized through the lens surface of the lens 111.

The half mirror 112 reflects the light from the LED 110 and transmits light from the conversion module 120. Specifically, the half mirror 112 reflects the light from the LED 110 that is incident through the lens 111 to the forward. On the other hand, the half mirror 112 transmits the light output from the conversion module 120 to the backward.

The overview of the function of the conversion module 120 is as described above. The structure and the function of the conversion module 120 are described in detail later.

The lens barrel 114 focuses the light that is output from the conversion module 120 and transmitted through the half mirror 112 on the image pickup surface of the CCD sensor 115.

The CCD (Charge Coupled Device) sensor 115 is a general solid-state image pickup device. The CCD sensor (image pickup portion) 115 includes a plurality of pixels arranged in matrix on its image pickup surface. By receiving light on each pixel, the CCD sensor 115 captures an image corresponding to the intensity distribution of infrared light. A general image pickup sensor such as CMOS (Complementary Metal-Oxide Semiconductor) or TFT (Thin Film Transistor) may be used for the CCD sensor 115.

The lens barrel 116 forms an infrared image on the front surface of the conversion module 120. A lens in the lens barrel 116 may be made of Ge, ZnSe or the like.

An object to be imaged exists in front of the lens barrel 116. The object radiates a heat ray (infrared light) according to its temperature. It is possible to acquire a thermal image of the object using the infrared camera 150.

The infrared camera 150 is housed in an appropriate case, so that the outside heat ray (infrared light) is input to the inside only through the lens barrel 116.

FIG. 18 shows the schematic cross-sectional structure of the conversion module 120. Referring to FIG. 18, the conversion module 120 includes a frame 121, a window plate 122, a silicon substrate (supporting substrate) 123, an insulating layer (heat insulating layer) 124, a laminate 125, a mask layer 127, and a transparent substrate 128. The conversion apparatus is composed of the silicon substrate 123, the insulating layer 124 and the laminate 125.

The frame 121 is a hollow cylindrical member and it supports the window plate 122, the silicon substrate 123 and the transparent substrate 128. Although the frame 121 may be made of any material, it is preferably made of a metal in order to ensure hermeticity.

The window plate 122 is a flat plate member that is substantially transparent to infrared light. The window plate 122 is preferably made of a Ge, ZnSe substrate or the like, for example.

The insulating layer 124 is placed on the silicon substrate 123. The laminate 125 is placed on the insulating layer 124. The laminate 125 is divided into a plurality of island portions in matrix by lattice-like grooves (cf. FIG. 19). The structure of the laminate 125 is described later with reference to FIG. 20.

The silicon substrate 123 has an opening OP1 under each laminate 125. In the silicon substrate 123, the openings are arranged in matrix corresponding to the laminates 125 arranged in matrix.

Because the laminate 125 is supported on the insulating layer 124 and the silicon substrate 123 has the opening under the laminate 125, it is possible to prevent heat from leaking from the laminate 125 to the silicon substrate 123. This enables acquisition of a better quality image in the infrared camera 150.

The mask layer 127 is a light shielding layer that is formed on the transparent substrate 128 using a normal semiconductor fabrication process. The mask layer 127 is patterned corresponding to the arrangement pattern of the laminate 125. The mask layer 127 has an opening OP2 under the laminate 125. The mask layer 127 is opaque to the light emitted from the LED 110. By forming the mask layer 127, it is possible to avoid interference of light output from the adjacent laminates 125, which enables acquisition of a better quality image.

The transparent substrate 128 is a plate member that is substantially transparent to the light emitted from the LED 110. The transparent substrate 128 may be made of glass, quartz or the like, for example.

As shown in FIG. 18, in the range immediately below the laminate 125, the opening OP1 is made in the silicon substrate 123, and the opening OP2 is made in the mask layer 127.

The light emitted from the LED 110 passes through the transparent substrate 128, the opening OP2 of the mask layer 127, the opening OP1 of the silicon substrate 123 and the insulating layer 124 in this order and then enters the laminate 125. The light output from the laminate 125 passes through the insulating layer 124, the opening OP1 of the silicon substrate 123, and the opening OP2 of the mask layer 127 and the transparent substrate 128 in this order.

In order to increase the reliability of the infrared camera 150, it is preferred to provide hermetic sealing or vacuum sealing of the frame 121 inside which the laminate 125 is placed. In this example, the frame 121 is hermetically sealed by attaching the window plate 122 to the frame 121. The space enclosed by the window plate 122 is filled with inert gas ($N_2$, Ar, He etc.). Further, the hermeticity is enhanced by attaching the transparent substrate 128 on which the mask layer 127 is formed to the backside of the frame 121. By hermetically sealing the frame 121 with the laminate 125 inside using the window plate 122, it is possible to prevent deterioration of the quality of an image acquired by the infrared camera 150 due to external environment conditions (e.g. ambient temperature, atmospheric airflow etc.).

Further, the internal space of the frame 121 that is enclosed by the window plate 122 may be evacuated into vacuum by means of a vacuum pump or the like. The same advantage as above can be obtained in this case as well. It is preferred to produce a vacuum for higher heat insulating properties.

A method of attaching the window plate 122 and the transparent substrate 128 to the frame 121 is arbitrary. For example, they may be attached to the frame 121 using a general sealing material.

FIG. 20 shows the detailed structure of the laminate 125. Referring to FIG. 20, the laminate 125 includes a dielectric layer 130, a reflecting layer (light reflecting layer) 132 and a black layer (heat ray absorbing layer) 133 in this order on the insulating layer 124. The order of lamination of the layers is not limited thereto.

The dielectric layer 130 is a layer formed by flocculating dielectrics 131a in the form of particles on which surfaces metal particles (conductive particles) 131b are attached.

The reflecting layer 132 has reflecting properties to reflect the light output from the dielectric layer 130. The reflecting layer 132 may be a metal thin layer such as Au, Al or Ag, for example.

The black layer 133 is made of a black material such as Au-black, carbon black, graphite, carbon nanotube or fullerene, or a black resin containing those, for example. The black layer 133 absorbs the infrared light that is transmitted through the window plate 122.

The dielectric layer 130 is formed by flocculating the dielectrics 131a in the form of particles on which surfaces the metal particles 131b are attached. The dielectrics 131a may be made of a material such as BST ((Ba—Sr)TiO$_3$). The metal particles 131b may be made of a metal such gold (Au) or silver (Ag), for example.

The particle diameter of the dielectrics 131a and the particle diameter of the metal particles 131b are both preferably small, on condition that the particle diameter of the dielectrics 131a is larger than the particle diameter of the metal particles 131b. This ensures a large contact area between the dielectrics 131a and the metal particles 131b.

The particle diameter of the metal particles 131b is set so as to enable generation of an evanescent wave and localization of plasmon (the preferred particle diameter of the metal particles 131b is about 2 to 10 nm). The shape of the metal particles 131b is arbitrary and not limited to a spherical shape.

The intensity of light attenuated by localized plasmon resonance depends on the dielectric constant of the dielectrics 131a. The dielectric constant of the dielectrics 131a depends on the temperature of the black layer 133. Accordingly, the degree of light attenuation by localized plasmon resonance corresponds to the dose of infrared light incident on the black layer 133. Therefore, it is possible to capture an image corresponding to the intensity distribution of external infrared light by imaging the intensity distribution of light output from each laminate 125.

The overall operation of the infrared camera 150 is described hereinafter with reference to FIG. 21.

Referring to FIG. 21, the light emitted from the LED 110 is parallelized by the lens 111, reflected by the half mirror 112 and incident on the laminate 125. After the light enters the laminate 125, a part of the light is attenuated in the dielectric layer 130 (hereinafter refer also to FIG. 20). Then, the light having the intensity according to the temperature of the black layer 133 is output from each piece of the dielectric layer 130. The light output forward from the dielectric layer 130 is reflected by the reflecting layer 132 in the backward direction.

The light output from the dielectric layer 130 passes through the opening of the mask layer 127 and is transmitted through the half mirror 112, the lenses 114a and 114b, and then incident on the CCD sensor 115.

The infrared light radiated from an external object to be imaged is focused on the surface where the laminate 125 is formed through lenses 105a and 105b. In such a mechanism, the CCD sensor 115 captures an image corresponding to the intensity distribution of the infrared light that is incident through the lenses 105a and 105b.

The configuration of the driving section of the infrared camera 150 is described hereinafter with reference to FIG. 22. Referring to FIG. 22, a driving section 140 includes a pulse generating circuit 141, a LED driving circuit 142 and a delay circuit 143.

The pulse generating circuit 141 outputs a pulse signal S1 when it receives a start signal input from a controller (not shown).

The LED driving circuit 142 drives the LED 110 in response to the input of the pulse signal S1.

The delay circuit 143 outputs a pulse signal S2 by adding a delay to the pulse signal S1.

The LED 110 outputs light, driven by the LED driving circuit 142. The CCD sensor 115 enters the standby state when it receives the pulse signal S1 and enters the state where an electronic shutter is opened when it receives the pulse signal S2. The CCD sensor 115 outputs a VIDEO signal after image pickup.

The output of the pulse generating circuit 141 is connected to the input of the LED driving circuit 142, the input of the delay circuit 143 and the first input of the CCD sensor 115. The output of the delay circuit 143 is connected to the second input of the CCD sensor 115.

In such a configuration, the LED 110 and the CCD sensor 115 are synchronized with each other.

A method of manufacturing the component (conversion apparatus) included in the conversion module 120 is described hereinafter with reference to FIGS. 23A to 23I.

Referring first to FIG. 23A, the insulating layer (S$_i$O$_2$) 124 is formed by oxidizing the back surface of the silicon substrate 123. A silicon nitride layer may be formed on the back surface of the silicon substrate 123 using a normal thin film formation process.

Referring next to FIG. 23B, a photoresist layer 160 is formed on the top surface of the silicon substrate 123 by a normal coating process (spin coating etc.).

Referring then to FIG. 23C, the photoresist layer 160 is patterned by exposure through a photomask and development.

Referring further to FIG. 23D, an opening is created by wet-etching the silicon substrate 123 from the backside. In this step, the insulating layer 124 functions as an etching stopper layer.

Referring then to FIG. 23E, a photoresist layer 161 is formed on the insulating layer 124 by a normal coating process (spin coating etc.).

Figure 23F:
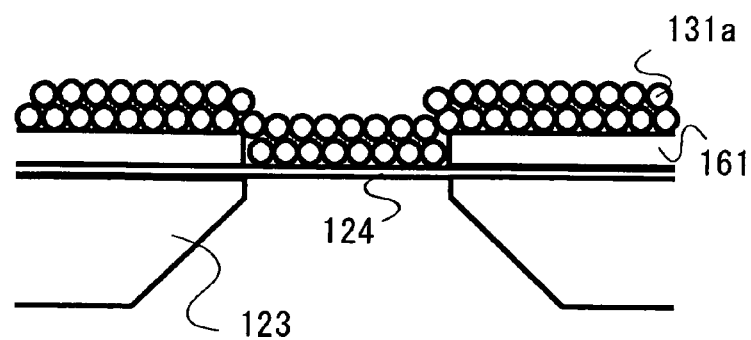

Referring then to FIG. 23F, the photoresist layer 161 is patterned by exposure through a photomask and development. Further, the dielectrics 131a are coated on the photoresist layer 161 and the insulating layer 124.

Figure 23G:
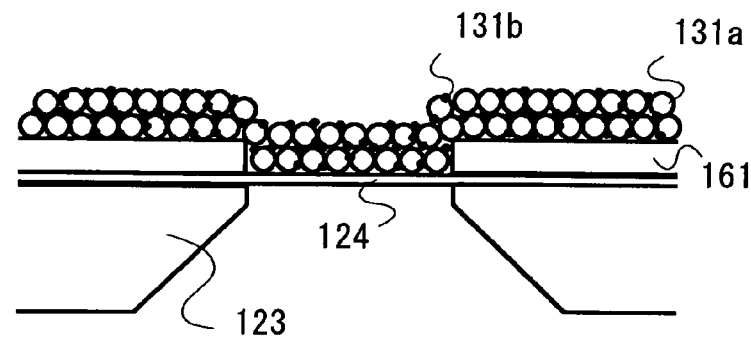

Referring then to FIG. 23G, the metal particles 131b are attached to the surfaces of the dielectrics 131a.

Figure 23H:
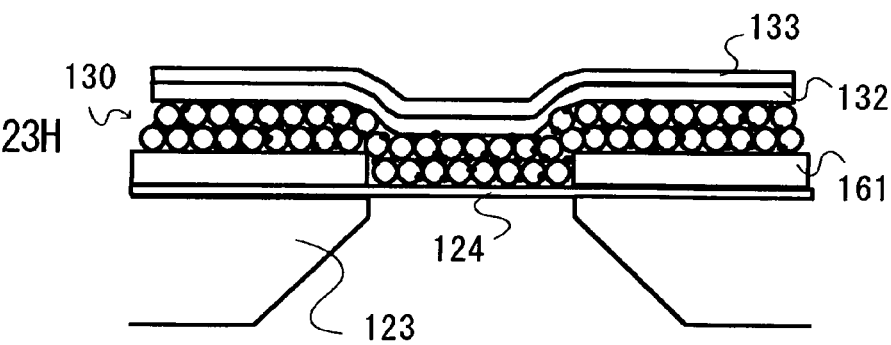

Referring then to FIG. 23H, the reflecting layer 132 and the black layer 133 are formed on the dielectric layer 130 by a normal thin film formation process (e.g. sputtering, vapor deposition etc.).

Figure 23I:
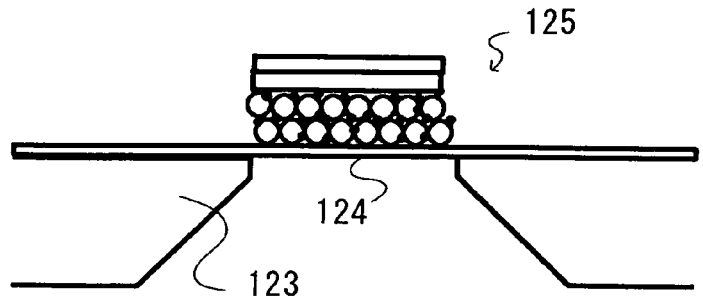

Referring finally to FIG. 23I, the dielectric layer 130, the reflecting layer 132 and the black layer 133 formed on the photoresist layer 161 are removed together with the photoresist layer 161 by the principle of lift-off.

In this embodiment, the black layer 133 that absorbs external infrared light (heat ray radiated from an object) and the dielectric layer 130 that is formed by attaching the metal particles 131b to the surfaces of the dielectrics 131a are laminated. Then, light is applied to the dielectric layer 130, and the intensity-modulated light is output from the dielectric layer 130. An image corresponding to the intensity distribution of a heat ray that is incident on each laminate 125 is thereby acquired. This achieves the image acquisition apparatus with a simple structure.

The advantage of this embodiment is additionally described with reference to FIG. 2 showing the first embodiment. In the first embodiment, the metal film (metal film 5), the dielectric film (dielectric layer 7) and the black film (infrared light absorbing layer 8) are placed on top of one another in this order on the principal surface of the base (prism 4). A thermal image is acquired using attenuation of light that occurs when the light is totally reflected on the interface between the base and the metal film.

Specifically, visible light is applied to the interface so as to satisfy the condition of total reflection. At the interface, the intensity of reflected light becomes lower than the intensity of incident light by surface plasmon resonance. The degree of light attenuation upon total reflection corresponds to the dielectric constant of the dielectric film that changes depending on the temperature of the black film. Therefore, it is possible to capture an image corresponding to the intensity distribution of infrared light incident on the black film by receiving the reflected light from the interface on each pixel of the image pickup device.

However, in this case, the metal film is closely contact with the base. Because the heat capacity of the base is large, the heat absorbed by the black film can leak to the base through the dielectric film and the metal film.

On the other hand, in this embodiment, the laminate 125 is formed on the insulating layer 124 that is formed above the hollow portion (opening OP1) of the silicon substrate 123. It is thereby possible to effectively avoid the leakage of heat from the laminate 125 to the silicon substrate 123. This enables acquisition of a better quality thermal image by the CCD sensor 115.

The present invention is not limited to the embodiments described above. A person skilled in the art is able to appropriately select a necessary material, a design value such as a member thickness without an excessive load. A light emitting source may be different from a semiconductor light emitting device such as LED and LD. Use of LD as a light source eliminates the need for a polarizing plate. The material of the infrared light absorbing layer may be a material different from a black resin as long as it is capable of absorbing infrared light effectively. This is the same for the material of the dielectric layer. This is also the same for the material of the prism. The image pickup device is not necessarily the one in which pixels are arranged two dimensionally, and it may be the one in which pixels are arranged in a row. The conductive thin film is not limited to the metal layer as long as localization of surface plasmon is possible. The conductive thin film may have any detailed structure. The image pickup device 9 may have any detailed structure as long as a plurality of pixels are arranged on a two-dimensional plane. The specific way of assembling the infrared camera is arbitrary. The heat ray absorbing layer may be made of a material different from a black resin. The heat ray absorbing layer functions as an infrared light absorbing layer.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An image acquisition apparatus for acquiring an image indicating an intensity distribution of infrared light, comprising:
    a conductive thin film;
    a dielectric layer placed on the conductive thin film;
    a base to support the conductive thin film and the dielectric layer in this order on a principal surface;
    a light source to emit light to an interface between the conductive thin film and the base; and
    an image pickup device to receive light reflected on the interface between the conductive thin film and the base.

2. The image acquisition apparatus according to claim 1, further comprising:
    an infrared light absorbing layer placed on the dielectric layer.

3. The image acquisition apparatus according to claim 2, further comprising:
    a filter placed above the infrared light absorbing layer, to transmit externally incident infrared light and block externally incident light having a wavelength different from a desired wavelength.

4. The image acquisition apparatus according to claim 3, further comprising:
    a support member to hold the filter in an opening and have a light shielding portion to partially prevent externally incident infrared light from entering the infrared light absorbing layer.

5. The image acquisition apparatus according to claim 2, further comprising:
    a light shielding member placed above the infrared light absorbing layer, to partially prevent externally incident infrared light from entering the infrared light absorbing layer.

6. The image acquisition apparatus according to claim 2, wherein
    the infrared light absorbing layer is divided into a plurality of pieces by a plurality of grooves extending substantially parallel to the principal surface of the base.

7. The image acquisition apparatus according to claim 1, further comprising:
    a plurality of condenser lenses.

8. The image acquisition apparatus according to claim 1, wherein
    the dielectric layer is divided into a plurality of pieces by a plurality of grooves extending substantially parallel to the principal surface of the base.

9. The image acquisition apparatus according to claim 1, wherein
    the conductive thin film is divided into a plurality of pieces by a plurality of grooves extending substantially parallel to the principal surface of the base.

10. The image acquisition apparatus according to claim 1, further comprising:
    a lens to parallelize light emitted from the light source.

11. The image acquisition apparatus according to claim 10, further comprising:
    a polarizer to output light in a predetermined polarized state based on input of light emitted from the light source.

12. The image acquisition apparatus according to claim 1, wherein
    the base includes:
    a flat-plate substrate having a first surface corresponding to the principal surface and a second surface opposite to the first surface, and a plurality of projecting portions placed on the second surface of the substrate, and each of the plurality of projecting portions has a light input surface for input of light emitted from the light source and a light output surface for output of light reflected from the interface.

13. An image acquisition apparatus for acquiring an image indicating an intensity distribution of externally incident infrared light, comprising:

a conductive thin film;

a dielectric layer placed on the conductive thin film, where a dielectric constant distribution is generated corresponding to an intensity distribution of the infrared light based on input of the infrared light;

a base to support the conductive thin film and the dielectric layer in this order on a principal surface;

a light source to emit light to an interface between the conductive thin film and the base; and an image pickup device to receive light reflected on the interface between the conductive thin film and the base and having a light intensity distribution corresponding to the dielectric constant distribution.

14. An image acquisition apparatus for acquiring an image indicating an intensity distribution of infrared light, comprising:

a conductive thin film;

a dielectric layer placed on the conductive thin film;

a base to support the conductive thin film and the dielectric layer in this order on a principal surface; and an image pickup device to receive light reflected on a interface between the conductive thin film and the base.

15. An image acquisition apparatus comprising:

a laminate including a heat ray absorbing layer laminated on a dielectric layer formed by attaching conductive particles to a surface of a dielectric;

a light source to emit light to be incident on the laminate; and an image pickup unit to receive light emitted from the light source and intensity-modulated by the dielectric layer and to capture an image corresponding to an intensity distribution of a heat ray incident on the laminate.

16. The image acquisition apparatus according to claim 15, wherein the laminate is divided into a plurality of island portions arranged two-dimensionally by a plurality of grooves cut to depth in a lamination direction of the laminate.

17. The image acquisition apparatus according to claim 16, further comprising:

a supporting member to support the laminate, the supporting member including:

a heat insulating layer to support the laminate on a principal surface, and a supporting substrate with the heat insulating layer placed on a principal surface.

18. The image acquisition apparatus according to claim 17, wherein the supporting substrate has a plurality of openings in positions corresponding to the plurality of island portions.

19. The image acquisition apparatus according to claim 15, wherein the laminate further includes a light reflecting layer placed between the heat ray absorbing layer and the dielectric layer, to reflect light emitted from the light source.

20. The image acquisition apparatus according to claim 15, wherein the dielectric layer is formed by flocculating dielectrics in particle form with the conductive particles attached to surfaces.

21. A conversion apparatus comprising:

a dielectric layer formed by attaching conductive particles to a surface of a dielectric;

a heat ray absorbing layer to absorb a heat ray; and a supporting member with at least the dielectric layer and the heat ray absorbing layer laminated on a principal surface.

22. The conversion apparatus according to claim 21, wherein the laminate formed by lamination of at least the dielectric layer and the heat ray absorbing layer is divided into a plurality of island portions arranged two-dimensionally by a plurality of grooves cut to depth in a lamination direction of the laminate.

23. The conversion apparatus according to claim 22, wherein the supporting member includes:

a heat insulating layer with the laminate placed on a principal surface, and a supporting substrate with the heat insulating layer placed on a principal surface.

24. The conversion apparatus according to claim 23, wherein the supporting substrate has a plurality of openings in positions corresponding to the plurality of island portions.

25. An image acquisition method for acquiring an image indicating an intensity distribution of a heat ray, comprising:

applying light to a laminate including a heat ray absorbing layer laminated on a dielectric layer formed by attaching conductive particles to a surface of a dielectric; and receiving light intensity-modulated by the dielectric layer and capturing an image corresponding to an intensity distribution of a heat ray incident on the laminate.

* * * * *